(12) United States Patent
Kodama et al.

(10) Patent No.: US 10,260,014 B2
(45) Date of Patent: Apr. 16, 2019

(54) CONCENTRATED SOLAR HEAT RECEIVER, REACTOR, AND HEATER

(71) Applicant: Niigata University, Niigata-shi (JP)

(72) Inventors: Tatsuya Kodama, Niigata (JP); Koji Matsubara, Niigata (JP); Nobuyuki Gokon, Niigata (JP)

(73) Assignee: NIIGATA UNIVERSITY, Niigata-shi (JP)

( * ) Notice: Subject to any disclaimer, the term of this patent is extended or adjusted under 35 U.S.C. 154(b) by 254 days.

(21) Appl. No.: 15/310,354

(22) PCT Filed: Apr. 23, 2015

(86) PCT No.: PCT/JP2015/062332
§ 371 (c)(1),
(2) Date: Nov. 10, 2016

(87) PCT Pub. No.: WO2015/174236
PCT Pub. Date: Nov. 19, 2015

(65) Prior Publication Data
US 2017/0145324 A1    May 25, 2017

(30) Foreign Application Priority Data
May 13, 2014   (JP) ................................. 2014-099859

(51) Int. Cl.
*C10J 3/20*     (2006.01)
*C10B 23/00*    (2006.01)
(Continued)

(52) U.S. Cl.
CPC ................. *C10J 3/20* (2013.01); *B01J 8/006* (2013.01); *B01J 8/0055* (2013.01); *B01J 8/0257* (2013.01);
(Continued)

(58) Field of Classification Search
CPC .......... Y02E 10/41; Y02E 10/40; Y02E 70/30; F24S 20/20; F24S 2023/88; F24S 23/70; Y02P 20/134
See application file for complete search history.

(56) References Cited

U.S. PATENT DOCUMENTS

| 1,661,473 A | 3/1928 | Goddard et al. |
| 4,033,118 A | 7/1977 | Powell |

(Continued)

FOREIGN PATENT DOCUMENTS

| JP | 54-108944 A | 8/1979 |
| JP | 55-144091 A | 11/1980 |

(Continued)

OTHER PUBLICATIONS

Hischier et al., "Experimental and Numerical Analyses of a Pressurized Air Receiver for Solar-Driven Gas Turbines", *Journal of Solar Energy Engineering*, May 2012, pp. 021003-1-021003-8, vol. 134.

(Continued)

*Primary Examiner* — Imran Akram
(74) *Attorney, Agent, or Firm* — Leason Ellis LLP

(57) ABSTRACT

A heat receiver, a reactor, and a heater utilize the heat of concentrated solar light for thermal decomposition and/or chemical reaction of coals, etc. The heat receiver includes: a side portion forming a substantially cylindrical side surface; a substantially circular bottom portion connected to the lower edge of the side portion; and a ceiling connected to the upper edge of the side portion. A substantially circular aperture is formed in the center of the ceiling. The heat receiver has a substantially cylindrical cavity and the opening portion is open. When the cavity has a diameter of D and a length of L, and the aperture has a diameter of d, d=D/2 or less and L=2D or more. Concentrated solar light entering the (Continued)

heat receiver is to be contained in the heat receiver to effectively utilize the solar light.

21 Claims, 18 Drawing Sheets

(51) Int. Cl.
| | | |
|---|---|---|
| F03G 6/06 | (2006.01) | |
| F28D 20/00 | (2006.01) | |
| F24S 20/20 | (2018.01) | |
| F24S 60/00 | (2018.01) | |
| F24S 23/75 | (2018.01) | |
| B01J 8/18 | (2006.01) | |
| B01J 8/38 | (2006.01) | |
| B01J 8/00 | (2006.01) | |
| B01J 8/02 | (2006.01) | |
| F24S 10/75 | (2018.01) | |
| F24S 23/70 | (2018.01) | |
| F24S 80/00 | (2018.01) | |

(52) U.S. Cl.
CPC .......... *B01J 8/0285* (2013.01); *B01J 8/1836* (2013.01); *B01J 8/388* (2013.01); *C10B 23/00* (2013.01); *F03G 6/06* (2013.01); *F03G 6/067* (2013.01); *F24S 20/20* (2018.05); *F24S 23/75* (2018.05); *F24S 60/00* (2018.05); *F28D 20/0056* (2013.01); *B01J 2208/00451* (2013.01); *B01J 2219/00247* (2013.01); *C10J 2300/093* (2013.01); *C10J 2300/0916* (2013.01); *C10J 2300/1284* (2013.01); *F24S 2010/751* (2018.05); *F24S 2023/88* (2018.05); *F24S 2080/05* (2018.05); *Y02E 10/41* (2013.01); *Y02E 10/46* (2013.01); *Y02E 60/142* (2013.01); *Y02E 70/30* (2013.01); *Y02P 20/134* (2015.11)

(56) References Cited

U.S. PATENT DOCUMENTS

| | | | | |
|---|---|---|---|---|
| 4,149,856 A * | 4/1979 | Keller | ........................ | C10J 3/20 48/62 R |
| 4,229,184 A | 10/1980 | Gregg | | |
| 4,290,779 A * | 9/1981 | Frosch | ........................ | C10J 3/56 422/186 |
| 4,455,153 A * | 6/1984 | Jakahi | ........................ | C10J 3/57 48/62 R |
| 4,472,367 A * | 9/1984 | Gibson | ................... | B01J 19/127 423/439 |
| 4,706,651 A * | 11/1987 | Yudow | ..................... | B01J 6/001 126/681 |
| 5,947,114 A * | 9/1999 | Kribus | .................... | F24S 20/20 126/680 |
| 7,140,181 B1 * | 11/2006 | Jensen | ................... | B01J 19/127 60/641.8 |
| 8,378,280 B2 | 2/2013 | Mills et al. | | |
| 2008/0086946 A1 * | 4/2008 | Weimer | ................. | B01J 19/127 48/89 |
| 2009/0205638 A1 | 8/2009 | Corcoran | | |
| 2009/0293939 A1 | 12/2009 | Zhang et al. | | |
| 2010/0154782 A1 * | 6/2010 | Hon | .......................... | F24J 2/07 126/616 |
| 2010/0242352 A1 * | 9/2010 | Perkins | ..................... | C01B 3/22 44/639 |
| 2010/0258429 A1 * | 10/2010 | Ugolin | ................... | B01J 8/0055 204/157.43 |
| 2012/0186251 A1 | 7/2012 | Epstein et al. | | |
| 2012/0291772 A1 | 11/2012 | Atarashiya et al. | | |
| 2013/0199093 A1 * | 8/2013 | Hathaway | ................. | C10J 3/72 48/62 R |
| 2014/0346034 A1 * | 11/2014 | Klausner | ................... | B01J 8/42 204/155 |
| 2016/0122670 A1 * | 5/2016 | Klausner | ................. | B01J 8/065 252/373 |

FOREIGN PATENT DOCUMENTS

| | | |
|---|---|---|
| JP | 2008-523351 A | 7/2008 |
| JP | 2009-535599 A | 10/2009 |
| JP | 2011-163593 A | 8/2011 |
| JP | 2015-86232 A | 5/2015 |
| WO | WO-2006/063450 A | 6/2006 |
| WO | WO-2011/068122 A | 6/2011 |
| WO | WO-2014/026746 A | 2/2014 |

OTHER PUBLICATIONS

International Search Report dated Jul. 14, 2015 for the corresponding PCT Application No. PCT/JP2015/062332.

* cited by examiner

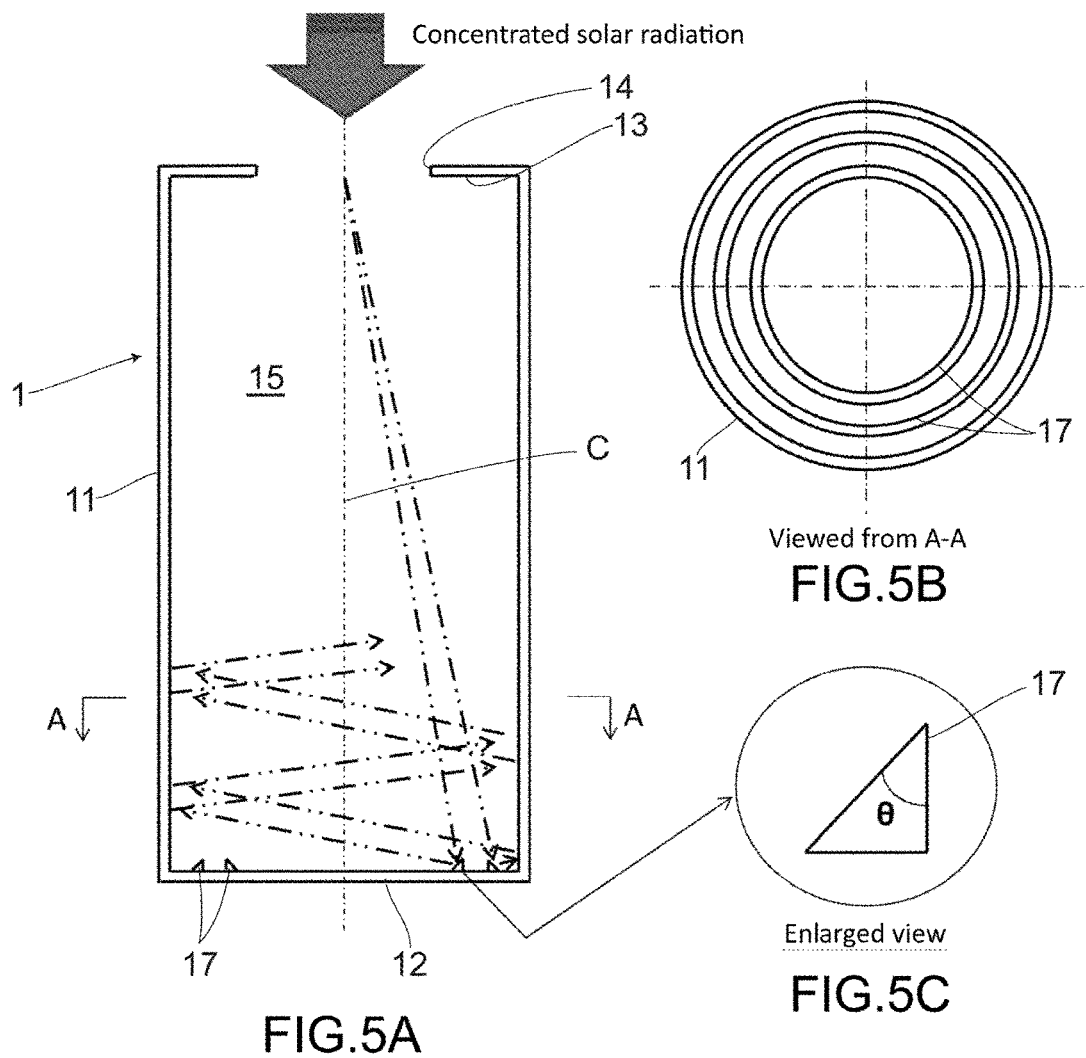

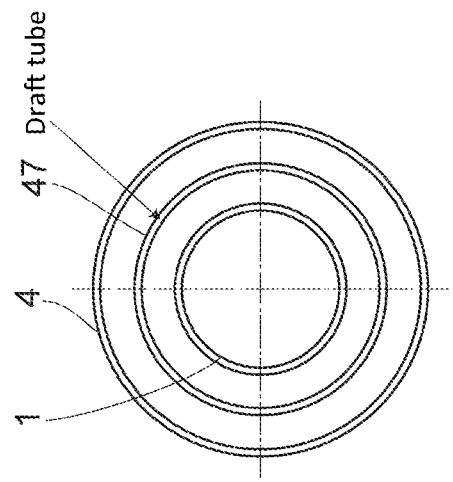
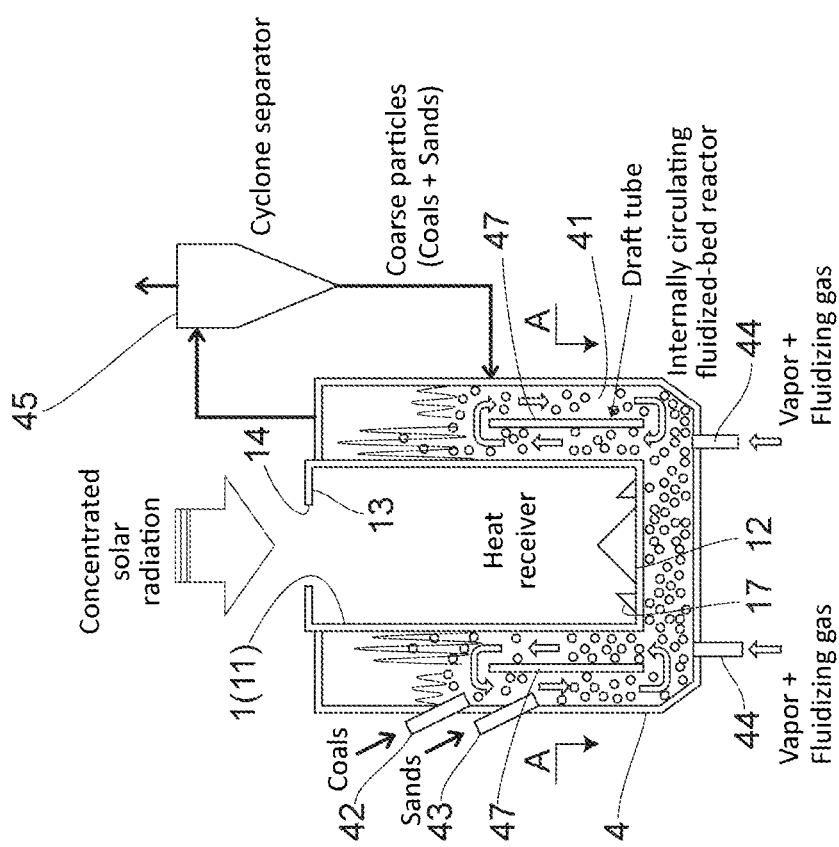
FIG.13B
FIG.13A

CONCENTRATED SOLAR HEAT RECEIVER, REACTOR, AND HEATER

CROSS-REFERENCE TO RELATED PATENT APPLICATIONS

This application is a U.S. National Phase application under 35 U.S.C. § 371 of International Patent Application No. PCT/JP2015/062332, filed Apr. 23, 2015, and claims the benefit of Japanese Patent Applications No. 2014-099859, filed May 13, 2014, all of which are incorporated by reference herein in their entireties. The International application was published in Japanese on Nov. 19, 2015 as International Publication No. WO/2015/174236 under PCT Article 21(2).

FIELD OF THE INVENTION

The present invention relates to a heat receiver, a reactor and a heating apparatus of concentrated solar radiation.

BACKGROUND OF THE INVENTION

Fossil fuels such as petroleum, natural gas, coals (particularly bituminous) and nuclear energy source (which are sometimes categorized as fossil fuels) have been heretofore utilized as energy sources. Additionally, global population growth and industrial progress have led to a rapid growth in energy consumption. Among these fossil fuels, coals are extremely abundant in terms of recoverable reserves, and are the most stable supply source. Up until recently, bituminous coals have been conventionally used among the coals. In the future, utilization of the low-grade coals (poor in transport and energy efficiency), such as lignite or subbituminous coals, which account for about a half of the coal resources, will become an important target. Sunbelt regions such as those in Australia, Southeast Asia and the United States of America are abundant in low-grade coals. Further, utilization of biomass such as wood will also become an important target. In order to make the effective use of these unutilized energies (low-grade coals or biomass), there can be utilized a concentrated solar radiation (renewable energy) to perform thermal decomposition and/or gasification to produce hydrogen, carbon monoxide, methane, etc., leading to the creation of a new type of energy source. The resultant gas mixture of hydrogen and carbon monoxide will become a raw material of hydrocarbon fuels such as kerosene, light oil, diesel oil, gasoline, dimethyl ether (DME), methanol, and etc. Additionally, methane is already in commercial use as a clean fuel.

Technical development is actively promoted for a technique of producing hydrogen, etc., through dissociating water by mean of high-temperature solar heat received from a concentrated solar light (see, e.g., Patent document 1). Unfortunately, as the method needs a use of a clear quartz plate as a light aperture (window) of the concentrated solar radiation, such method is not applicable to a thermal decomposition reaction of coals that generate tar or soot.

In recent years, technical development of utilizing a concentrated solar radiation for thermal decomposition of cokes have been pursued (see, e.g., patent document 2), but this technique is applicable only where no tar or soot be generated.

Further, a new attempt at heating the air, by means of concentrated solar radiation, to be fed to a gas turbine is also being made (see, e.g., non-patent document 1). Unfortunately, this technique takes no measures for the heat leakage caused by the reflection and/or re-radiation of concentrated solar radiation that is irradiated upon a heat receiver. Also, on the periphery of this heat receiver is arranged components made of form material having extremely poor thermal transference and absorptivity.

Here, FIGS. 14 to 17 illustrate examples of conventional reaction apparatuses.

FIG. 14 illustrate a system having a multitude of heliostats tracking the movement of the sun and a beam-down light collecting system. The system collects solar lights and then guides the collected solar lights to a reaction apparatus, while introducing water vapor to the reaction apparatus to produce hydrogen by means of two-step thermochemical water-splitting cycle using metal oxide such as iron oxide contained in the reaction apparatus. This two-step thermochemical water-splitting cycle alternately switches from a step of producing hydrogen through a chemical reaction of water vapor and metal oxide (thermochemical water-splitting reaction at the temperature of 900° C.) to a step of performing reductive reaction of metal oxide using, e.g., nitrogen gas (thermal reduction reaction at reaction temperature of about 1400° C.) in a repetitive manner.

FIG. 15 illustrate a system having a multitude of heliostats tracking the movement of the sun and a towered light collecting system. The system collects solar lights and then guides the collected solar lights to a reaction apparatus, while introducing water vapor to the reaction apparatus for producing hydrogen by means of two-step thermochemical water-splitting cycle using metal oxide such as iron oxide contained in the reaction apparatus. This apparatus has a configuration of horizontally laying the apparatus as illustrated in FIG. 14

FIG. 16 illustrates a system that guides collected solar lights to a reaction apparatus while introducing coke and sand through an upper sidewall, and then introduces water vapor through a bottom portion of the reactor for producing hydrogen by means of thermal decomposition reaction. This system is an example of the application of a thermal decomposition of coke in art operation condition where no tar or soot is to be generated.

In an example as illustrated in FIG. 17 ($a$), solar lights collected from a multitude of heliostats are guided to a heat receiver at various angles. This heat receiver is made of heat resisting material, particularly of Inconel, alumina, silicon carbide, or the like when being used in a condition of higher temperature, or of stainless steel when being used in a condition of a lower temperature. The concentrated solar radiation is partially leaked to the outside of the heat receiver through reflection and/or re-radiation. This Figure illustrates the way how light beams are reflected within the heat receiver when the depth and diameter of the heat receiver are set to be about the same length where incident angles of the collected solar lights, or elevation angles ($\alpha$) with respect to the central axis of the heat receiver, are respectively set to be 10°, 20°, 30°, 40° or 50° degrees. The number of reflections of a light beam within the heat receiver is as small as 1 to 3, showing a large amount of heat radiation loss.

FIG. 17($b$) illustrates the way how light beams are reflected within the heat receiver when the depth of the heat receiver are set to be about twice the diameter thereof where incident angles of the collected solar lights, or the elevation angles ($\alpha$) with respect to the central axis of the heat receiver, are respectively set to be 10°, 20°, 30°, 40° or 50° degrees. The number of reflections of a light beam within the heat receiver is as small as 2 to 6, implicating a large amount of heat radiation loss.

FIG. 18 illustrates an example of a conventional heat storage system by means of solar light collection. Such heat storage system can be categorized as, a sensible heat storage system (liquid: oil, solids: cement, solid particle, etc.), a latent heat storage system (molten salt, etc.), or a chemical heat storage system. These heat storage system are designed to be operable when being exposed to the solar light, as well as when not being exposed to the solar light (e.g., when solar light is shut out by clouds, or during night-time). Heat storage capacity of the system depends on operating periods during which the system is not exposed to the solar light. Note that this conventional example relates to a sensible heat storage system of solid particle and a chemical heat storage system. The reactant material in the chemical heat storage is in a solid particle state. For this reason, the sensible heat storage system of solid particle and the chemical heat storage system are similar to each other. Here, within the heat receiver is filled with honey comb structures (or foam). That's because solar light cannot directly heat the air. Consequently, the collected solar lights first heat honey comb structures, and the honey comb structures subsequently heat the air. These honey comb structures have a smaller surface area, narrow passages and a small heat transfer rate, which make it difficult to heat the air in a rapid manner.

As illustrated in FIG. 18 (a), under the solar light, the concentrated solar radiation passes through the quartz plate (window) to the heat receiver, causing a low temperature air, fed to the heat receiver, to be heated to a high temperature via the honey-comb structures, forcing the heated air mass to be streamed in parallel through a steam generator and a heat storage tank. The heated air mass fed to the steam generator heats water, generating steam, thus causing the air mass to be in a lower temperature, which is then circulated in the heat receiver. The resultant vapor generates electricity by means of a steam turbine and a generator. The high-temperature air mass fed to the heat storage tank will then pass through small gaps in-between metallic oxide particles, thus producing laminar flow and reducing the a heat transfer rate to be small. The high-temperature air mass slowly conducts heats to heat-storage particles, causing the air mass to be in a lower temperature, which is then circulated in the heat receiver. The metallic oxide particles thus heated within the heat storage tank emit oxygen through a chemical reaction, thereby storing thermochemical heat. In this way, the metallic oxide particles store both sensible heat and thermochemical heat.

As illustrated in FIG. 18 (b), when not being exposed to the solar light, a valve will be switch thereto to feed the air to the heat storage without passing through the heat receiver, thereby rendering the metallic oxide particles within the heat storage tank to be chemically reacted with oxygen in the air, releasing heat, thus heating the air. The heated air mass fed to the steam generator heats water, generating steam, causing the air mass to be in a lower temperature, which is then circulated in the heat receiver. The resultant vapor generates electricity by means of a steam turbine and a generator. Note that this conventional art employs a large heat storage tank. For this reason, it takes a large amount of time to switch from the heat storage mode to the heat releasing mode, thus making it difficult to be adapted in a cloudy weather.

PRIOR ART DOCUMENT

Patent Document

Patent Document 1: PCT International Publication No. WO2011/068122

Patent Document 2: Japanese Patent Application No. 2013-222867

Patent Document 3: Japanese Unexamined Patent Application Publication (Translation of PCT Application) No. 2008-523351

Patent Document 4: Japanese Unexamined Patent Application Publication (Translation of PCT Application) No. 2009-535599

Non-Patent Document

Non-Patent Document 1: I. Hischier, P. Leumann, A. Steinfeld, "Experimental and Numerical Analyses of a Pressurized Air Receiver for Solar-Driven Gas Turbines", Journal of Solar Energy Engineering, May 2012, Vol. 134/P. 021003.)

Problem to be Solved by the Invention

According to conventional reaction apparatuses, attached to the top portion thereof is a quartz disk, which poses the following disadvantages.

(1) In order to enhance optical transmissivity, a high-purity quartz plate need to be employed as a quartz disk, which is expensive.

(2) According to a system where many heliostats are employed for collecting solar lights (or heats), the collected solar lights cannot be well focused to a focal point, and the designed system need to employ a quartz disk having a diameter of greater than one meter, which makes the quartz disk expensive.

(3) As described above, this quartz disk has such a large diameter, and the reaction apparatus is unable to have a high internal pressure, though it depends on the thickness of the quartz disk, thus limiting the operation of these systems to a low pressure condition.

(4) In a course of transmitting solar lights through a quartz disk, there will be occurred a transmission loss, thereby resulting in a distribution of temperature in the quartz disk. The quartz disk can be circumferentially cooled but cannot be cooled from the inside. For this reason, the inhomogeneous distribution of temperature causes a heat stress, thereby posing a risk that the quartz disk be broken. Further, if the quartz disk is to be cooled, thermal energy will be lost in accordance therewith.

(5) The collected solar heat brings about a chemical reaction within the reaction apparatus. However, any usage of a substance containing carbon (such as that containing coals and/or wood) brings about soot and/or tar, which is/are to be adhered to the quartz disk, thereby reducing optical transmissivity to an extremely low level within an extremely short period of time. Consequently, under the present circumstances, such apparatus can be applied only to a situation where no soot or tar is generated.

It is an object of the present invention to provide a heat receiver, reaction apparatus and heating apparatus enabling a high-efficient thermal decomposition and chemical reaction of coals or the like (including biomass such as wood) using solar heat obtained from collecting solar lights. That is, it is an object of the present invention to provide a heat receiver, reaction apparatus and heating apparatus that guides concentrated solar radiation to the heat receiver while preventing the guided solar light from leaking out of the apparatus through reflection and/or re-radiation, and enables unanimous, or regulated setting of the temperature inside the heat receiver. Further, the heat receiver is combinable with the heating apparatus and the reaction apparatus, arranged on the periphery of the heat receiver and operable at elevated pressure and temperature, in order to perform thermal decomposition or chemical reaction of coals or the like in an optimum condition.

SUMMARY OF THE INVENTION

Means to Solve the Problem

The heat receiver of concentrated solar radiation includes: a side portion; a bottom portion connected to a lower end of the side portion; a ceiling connected to an upper end of the side portion; an aperture provided in the ceiling; and a reflector provided on an inner wall of the side portion or the bottom portion, the reflector reflecting a solar light toward the inner wall, wherein the side portion, the bottom portion and the ceiling define a cavity having the aperture and an inner wall absorbing a solar light.

The aperture has an opening area of s satisfying an inequation $s \leq S/4$ wherein S denotes an inner surface area of the ceiling inclusive of the opening area of the aperture within the cavity.

The cavity has an substantially cylindrical shape and the aperture has an substantially circular shape, wherein if D denotes a diameter of the cavity, L denotes a length of the cavity and d denotes a diameter of the aperture, they satisfy inequations $L \geq 2D$ and $d \leq D/$ A conical reflector is provided in a central part of the bottom portion, wherein the conical reflector has a diameter not smaller than the diameter of d, and an elevation angle of the conical reflector, with respect to the central axis of the cavity, is in a range from 30° to 60° degrees At least one reflector is concentrically arranged on the bottom portion.

The cavity has a first diameter at the ceiling different than a second diameter at the bottom portion.

The receiver is made of any one of Inconel, alumina, silicon carbide and stainless steel.

The receiver is made of a black material, or has an inner wall coated with black paint.

The reaction apparatus of the present invention includes a reactor arranged around the heat receiver with a predetermined distance from the heat receiver in a manner covering the side and bottom portions of the heat receiver.

The reaction apparatus further includes a draft tube inside the reactor.

A heating apparatus of the present invention includes any one of the above described reaction apparatus and a heater arranged around the heat receiver with a predetermined distance from the heat receiver in a manner covering the side and bottom portions of the heat receiver.

The heating apparatus further includes fins arranged on an inner wall of the heater The heating apparatus further includes flow rectifiers arranged on a bottom portion of the heater.

Effects of the Present Invention

According to the heat receiver, the reaction apparatus and the heating apparatus of the present invention, the concentrated solar radiation irradiated upon the heat receiver can be contained within the heat receiver to make effective use of the concentrated solar radiation.

BRIEF DESCRIPTION OF THE DRAWINGS

FIGS. 5A-5C are explanatory drawings illustrating reflective paths of concentrated solar radiations within the heat receiver according to a third embodiment.

FIGS. 13A and 13B are schematic diagrams illustrating a reaction apparatus according to an eleventh embodiment thereof.

DETAILED DESCRIPTION OF THE INVENTION

Embodiments of a heat receiver, a reaction apparatus and a heating apparatus of the present invention will now be described hereunder with reference to the accompanying drawings.

First Embodiment

Figure 1:
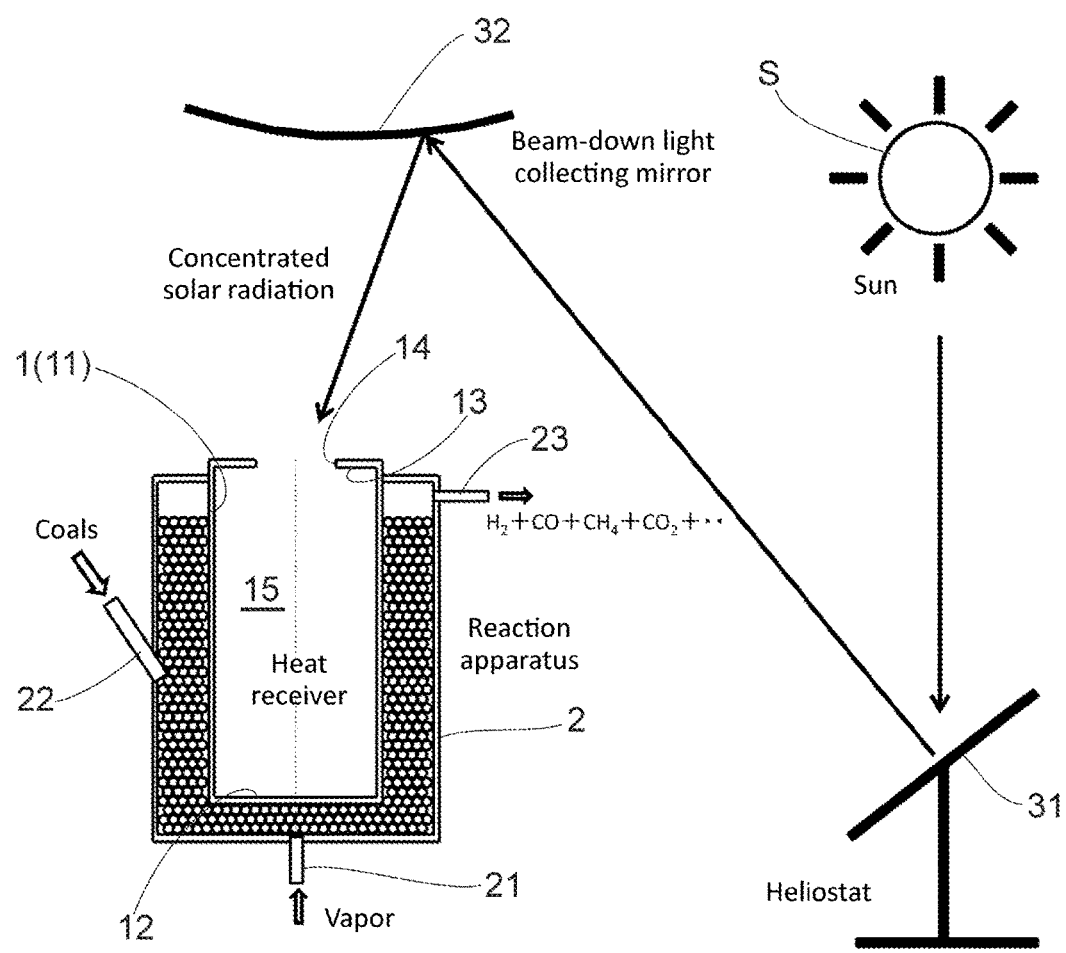
FIG. 1 is schematic diagram illustrating a main framework of a heat receiver and a reaction apparatus according to a first embodiment thereof.

The reaction apparatus of concentrated solar radiation, as illustrated in FIG. 1 of the present embodiment, is a production system of hydrogen or the like by means of thermal decomposition of coke. Numeral 1 denotes a heat receiver made of a heat resisting material having high solar light absorptivity, such as Inconel, alumina, silicon carbide, stainless steel or the like. The heat receiver 1 includes a side portion 11 forming a cylindrical lateral face; a circular bottom portion 12 connected to a lower end of the side portion 11 to form a base of the heat receiver 1; and a ceiling 13 connected to an upper end of the side portion 11 to form a ceiling plane of the heat receiver 1. Further, through the center of the ceiling 13 is bored a circular aperture 14. That is, the heat receiver 1 has a cylindrical profile with a cylindrical cavity 15 having an aperture 14 bored through to the inside. Note that the aperture 14 is provided with nothing at all, and the cavity 15 is in communication with the outside via the aperture 14.

Around the periphery of the heat receiver 1 is arranged a reactor 2 with a predetermined distance spaced apart from the heat receiver 1 in a manner covering the bottom portion 12 and a large part of the side portion 11. The reactor 2 is provided with an inlet 21 arranged on the bottom portion thereof for introducing water vapor, an inlet 22 arranged on the side portion thereof for introducing coals or the like, an outlet 23 arranged on an upper side portion thereof for discharging the resultant gas, such as hydrogen, methane, or carbon dioxide, thus produced in a course of the reaction. The reactor 2 is tightly sealed all but portions provided with the inlets 21, 22 and the outlet 23.

Numeral 31 denotes heliostats, and numeral 32 denotes a light collecting mirror of beam-down type provided on the tower (not shown). The heliostats 31 together with the light collecting mirror 32 consist a beam-down light collecting system. The beam-down light collecting system is designed to collect lights from the sun S and to guide them, as a concentrated solar radiation, through the aperture 14 to the inside of the heat receiver 1. Here, only one of the heliostats 31 is illustrated herein but there are arranged a multitude of heliostats 31 in practical use.

In the configuration as described above, coal particles are fed through the inlet 22 to the inside of the reactor 2, while water vapor are fed through the inlet 21. Then, by means of the heliostats 31 and the beam-down light collecting mirror 32, there is guided a concentrated solar radiation through the aperture 14 to the inside of the heat receiver 1. Inside the receiver is repeatedly reflected the concentrated solar radiation by the side and bottom portions 11, 12 of the heat receiver 1, and the inner wall of the ceiling 13; that is, by the surface of the cavity 15, thus heating the heat receiver 1. The heated heat receiver 1 then heats the coal particles stored within the reactor 2. Inside the reactor 2, thermal decomposition of the coals is progressed, and the resultant gas such as hydrogen or carbon monoxide is discharged through the outlet 23.

Here, inner wall of the heat receiver 1 need to be designed to reduce heat loss, associated with reflection and/or re-radiation of solar lights, and eventually to absorb heat accompanied by such solar light in a rapid manner. To achieve this purpose, the heat receiver 1 may be formed of a black material. Alternatively, on the inner wall of the heat receiver 1 may be painted in black, if necessary, as an effective method therefor.

The light collecting systems of solar light shall not be limited to a beam-down light collecting system of the present embodiment; that is, a light collecting system of central tower or parabolic dish is also employable.

In what follows is a detailed description of the heat receiver 1.

Figure 2:
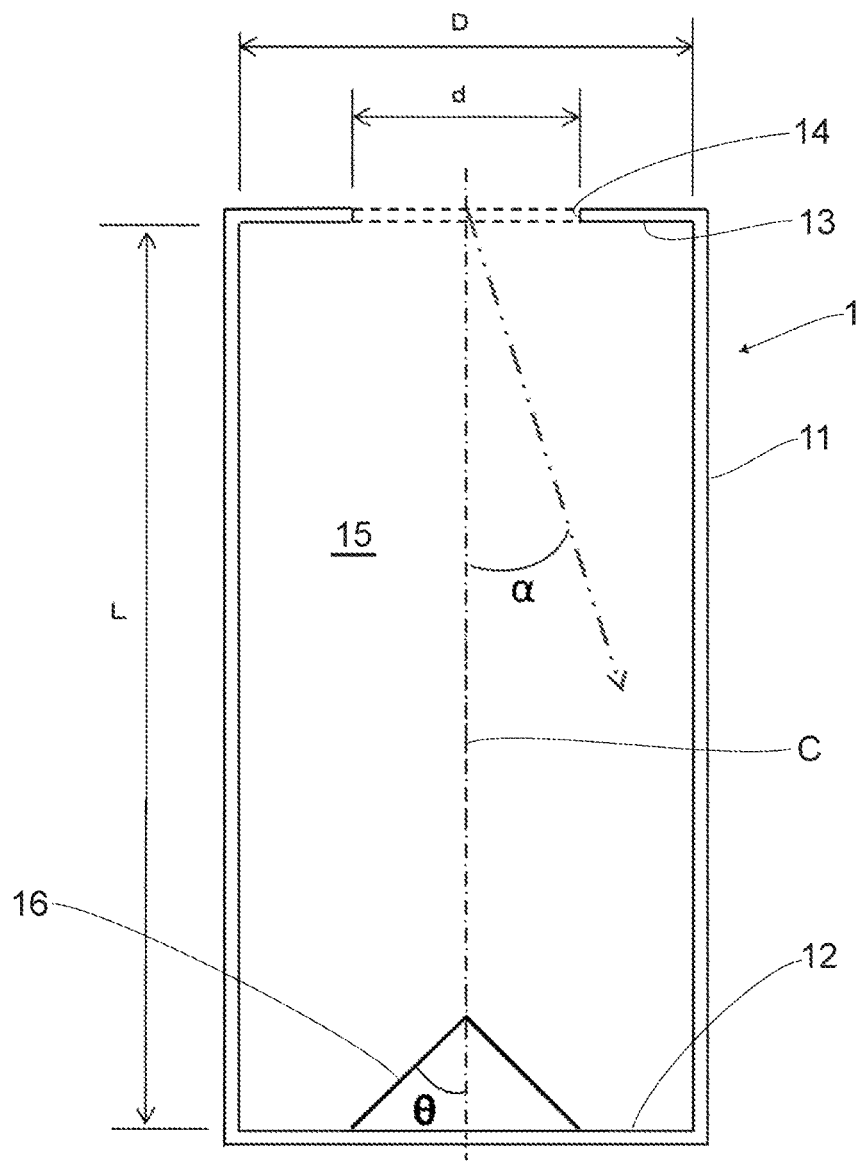
FIG. 2 illustrates an explanatory drawing illustrating a description of the reference signs to be denoted in embodiments of the heat receiver.

First, described hereunder are symbols to be used for the description of the receiver 1 with reference to FIG. 2. The symbol D denotes a diameter of the cavity 15, the symbol L denotes a length of the cavity 15, the symbol d denotes a diameter of the aperture 14, serving as an entrance of the concentrated solar radiation, in the heat receiver 1, and the symbol $\alpha$ denotes elevation angles with respect to the central axis C of the cavity 15 in the heat receiver 1. Further, the numeral 16 denotes a conical reflector to be described hereafter and the symbol $\theta$ denotes an elevation angle of the reflector 16 with respect to the central axis C of the cavity 15.

Figure 3:
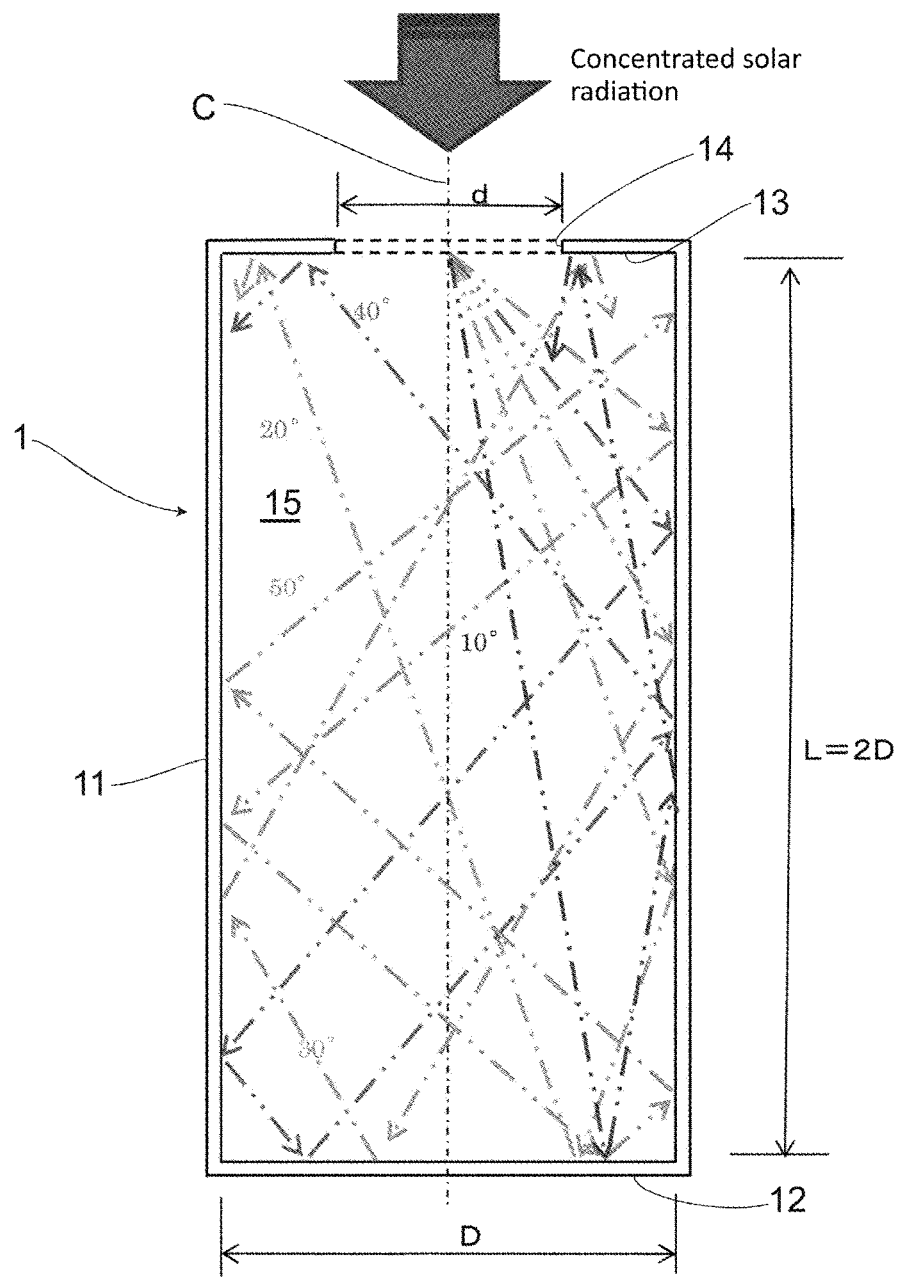
FIG. 3 is an explanatory drawing illustrating reflective paths of concentrated solar radiations within the heat receiver according to the first embodiment.
Figure 17A:
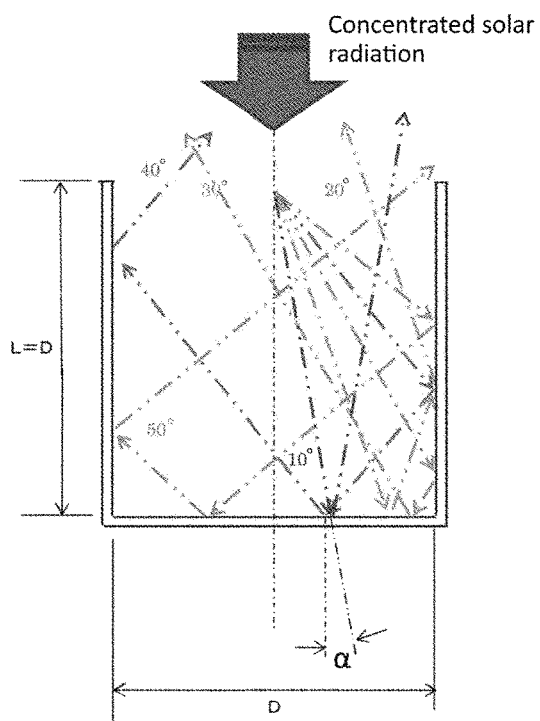
FIGS. 17A and 17B illustrate explanatory drawings illustrating reflective paths of concentrated solar radiations within a conventional heat receiver where (a) illustrates a heat receiver of L=1D, and (b) illustrates a heat receiver of L=2D.
Figure 17B:
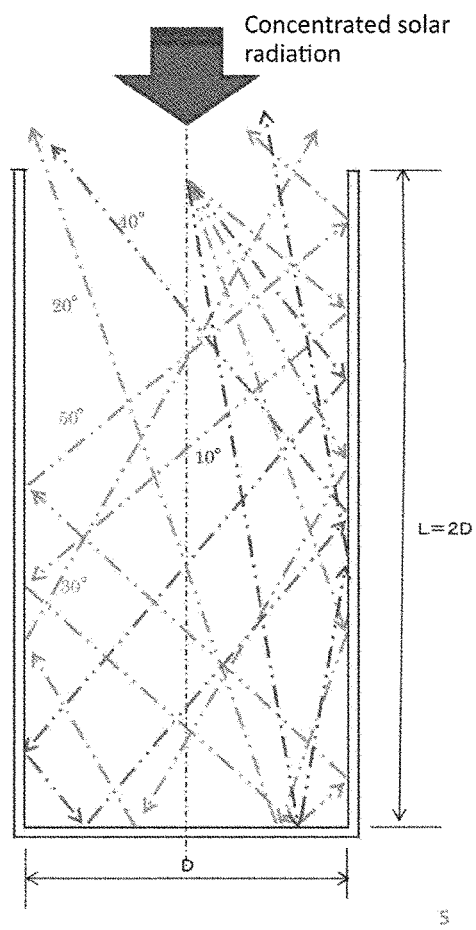
Figure 18A:
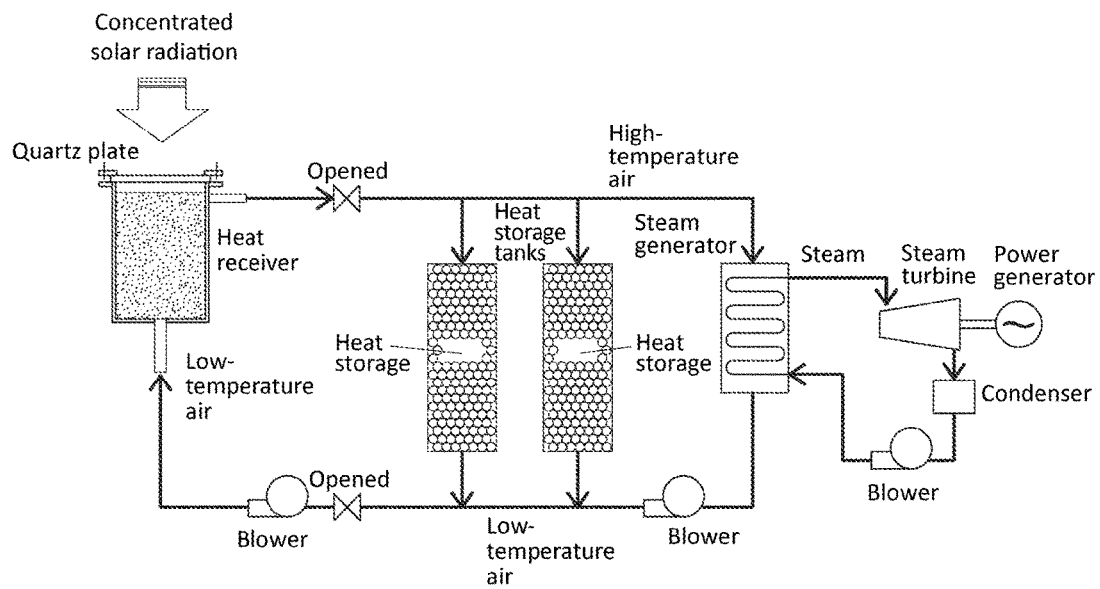
FIGS. 18A and 18B are schematic diagrams illustrating a conventional heat storage system using solar light collection.
Figure 18B:
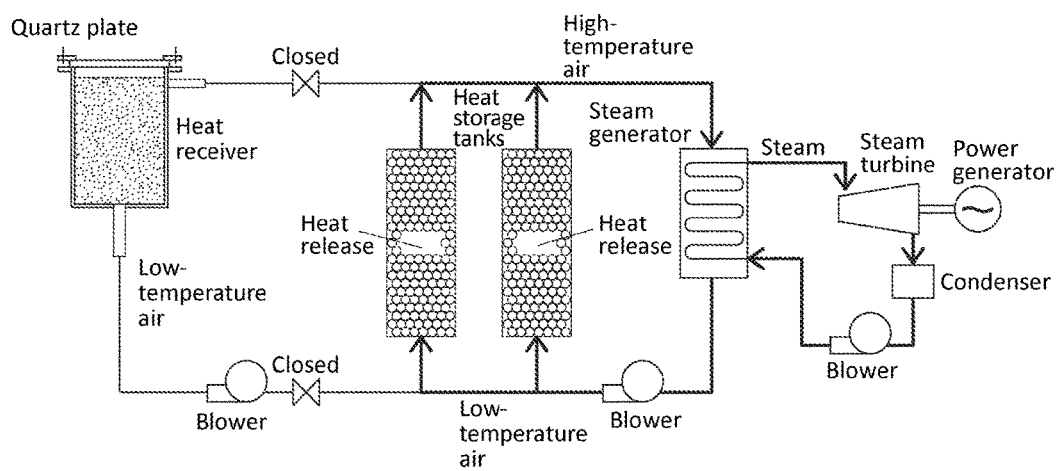

As illustrated in FIG. 3, the heat receiver 1 is designed to have dimensions of $d=\frac{1}{2}D$, $L=2D$. The concentrated solar radiation is a bundle of lights collected by a multitude of the heliostats 31. The concentrated solar radiation then guided to the heat receiver 1 at various incident angles. FIG. 3 illustrates reflective paths of concentrated solar radiations inside the heat receiver 1. In a case that incident angles of the concentrated solar radiation are defined as elevation angles $\alpha$ with respect to the central axis C of the heat receiver 1, and that the elevation angles $\alpha$ are respectively set to be 10°, 20°, 30°, 40° or 50° degree, the number of reflections with respect to each concentrated solar radiation is greater than or equal to five. Evidently, heat radiation loss can be extremely reduced as compared to conventional arts (e.g., see FIG. 17) where the number of reflections is as small as 2 to 6 depending on the incident angles.

In order to take advantage of the concentrated solar radiation irradiated upon the heat receiver 1, the concentrated solar radiation needs to be contained within the heat receiver in the best way possible to prevent a leakage of the concentrated solar radiation irradiated upon the heat receiver 1 to the outside by reflection and/or re-radiation. To achieve that, it is preferred that the light beam irradiated upon the heat receiver 1 be reflected a multitude of times within the heat receiver 1. Particularly, it is preferred that the cavity 15 of the heat receiver 1 be designed to have suitable dimensions to allow a concentrated solar radiation, irradiated through the center of the aperture 14 with an elevation angle $\alpha$ of 10 degree or more, to be reflected four or more times by the inner wall of the heat receiver 1. To achieve that, it is preferred that the cavity 15 of the heat receiver 1 be designed to have dimensional ratios of $d \leq D/2$ and $L \geq 2D$. If d satisfies $d \leq D/2$, and if s denotes an area of the aperture 14 and S denotes an inner surface area of the ceiling inclusive of the area of the aperture 14 within the cavity, then a surface area s of the aperture 14 satisfies $s \leq S/4$ Here, the inner wall of the heat receiver 1 absorbs most of the solar-light heat on a spot where the solar light is irradiated, while the un-absorbed heat partially reaches to another spot of the inner wall as a reflective light, which is then absorbed on that another spot.

As described above, the heat receiver 1 of concentrated solar radiation, according to the present embodiment, includes the side portion 11 forming a substantially cylindrical lateral face; the substantially circular bottom portion 12 connected to a lower end of the side portion 11 to form a base of the heat receiver 1; and the ceiling 13 connected to an upper end of the side portion 11 to form a ceiling plane of the heat receiver 1. In the center of the ceiling 13 is bored an aperture 14 of substantially circular shape, forming the cylindrical cavity 15 having the aperture 14 bored therethrough. Additionally, the side portion 11, the bottom portion 12 and ceiling 13 are formed with inner walls that absorb solar lights. Further, the cavity 15 has a diameter of D and a length of L satisfying an inequation $L \geq 2D$, while the aperture 14 has a diameter of d satisfying an inequation $d \leq D/2$. Consequently, the concentrated solar radiation irradiated upon the heat receiver 1 is contained within the heat receiver 1 to take an advantage of the concentrated solar radiation irradiated thereupon.

Note that the heat receiver 1 may be formed not only in a shape of substantial cylinder but also of polygonal cylinder in cross-section. The aperture 14 may be polygonally shaped. Even if the heat receiver 1 has a shape of polygonal cylinder, and/or the aperture 14 has a polygonal shape, the opening area s of the aperture and the surface area S of the ceiling 13 inclusive of the aperture 14 in the cavity 15 can be designed to satisfy the condition of s≤S/4 to allow the concentrated solar radiation irradiated through the center of the aperture 14 with the elevation angle α of 10° degree or more to be reflected four or more times by the inner wall of the heat receiver 1, thereby enabling an effective use of the concentrated solar radiation irradiated upon the heat receiver 1.

Further, there may be provided a reflector on an inner wall of the side portion 11 or of the bottom portion 12 reflecting solar lights toward the inner walls thereof. The reflector will be described in the following embodiments.

Second Embodiment

Figure 4:
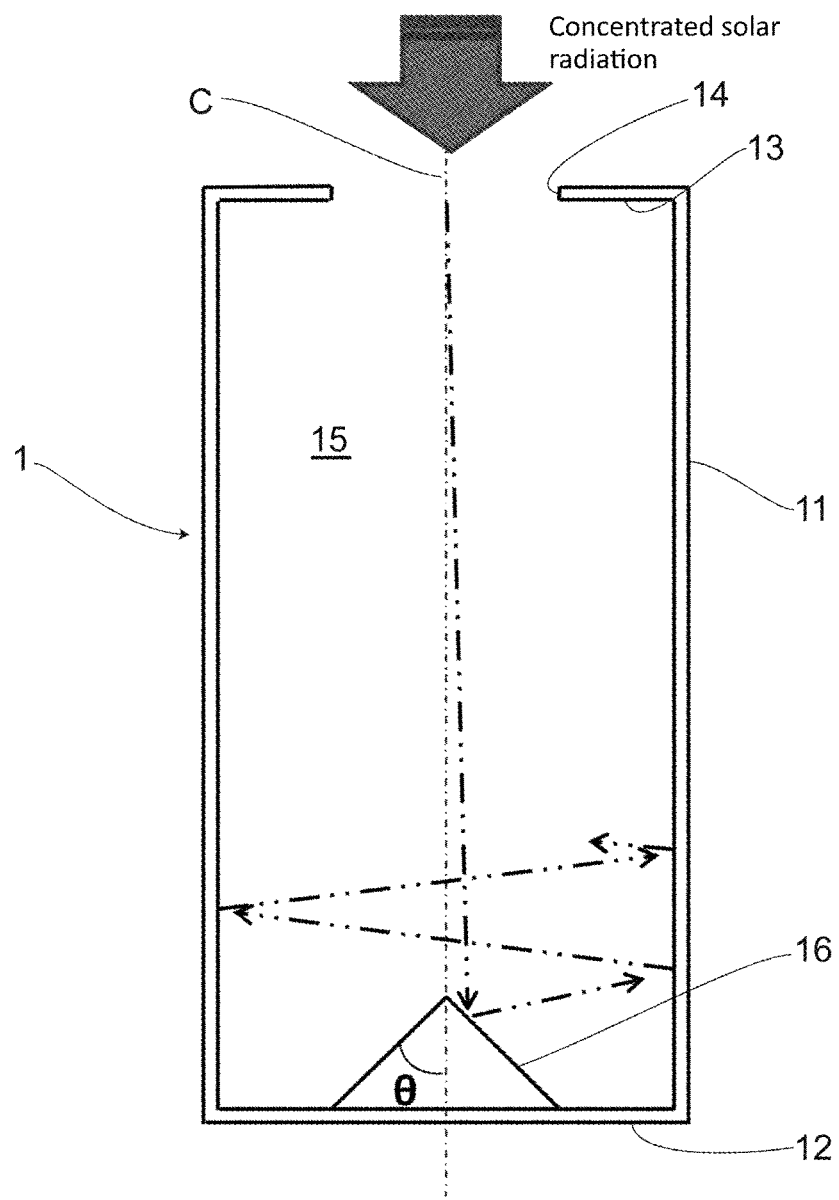
FIG. 4 is an explanatory drawing illustrating reflective paths of concentrated solar radiations within the heat receiver according to a second embodiment.

In an embodiment as illustrated in FIG. 3, a concentrated solar radiation, irradiated with a small angle α with respect to the central line C of the heat receiver 1, is to be ejected out of the heat receiver 1 with a small number of reflection. Due to this feature, in an embodiment as illustrated in FIG. 4, there is arranged a conical reflector 16 in a central portion of the bottom portion 12 of the heat receiver 1. It is preferred that the reflector 16 be conically shaped, having a diameter not smaller than d and that an elevation angle θ with respect to the central line C of the heat receiver 1 be in a range of 30 to 60 degrees.

As described above, there is arranged the conical reflector 16 in a central portion of the bottom portion 12, and the reflector 16 has a diameter not smaller than d and an elevation angle θ with respect to the central line C of the cavity 15 is in the range of 30° to 60° degrees. This concentrated solar radiation irradiated with a small angle α with respect to the central line C thereof is prevented from being leaked out of the heat receiver 1 with a small number of reflections, thereby enabling an effective use of the concentrated solar radiation irradiated upon the heat receiver 1.

Third Embodiment

According to an embodiment as illustrated in FIG. 5, in order to smooth out the irradiation intensity of the solar light onto the inner wall of the heat receiver 1, on a bottom portion of the heat receiver 1 is concentrically arranged two circular reflectors 17 having triangular cross sections. By suitably setting the elevation angles θ of the reflectors 17, with respect to the central line C of the heat receiver 1, and properly setting the number of the reflectors 17, solar lights are uniformly reflected by the inner wall of the heat receiver 1.

According to the first and second embodiments, the reflectors 16 and 17 has a convex outer surface although a reflector having a concave outer surface may be arranged on the bottom portion 12 of the heat receiver 1. If the reflector has a concave outer surface, the number of reflection that the solar light is reflected thereby until the solar light reaches to the side wall is large. Owing to this feature, it is preferred that the reflector has a convex outer surface for the solar light to be reflected with a fewer reflection number until the solar light reaches to the side wall.

Further, on the bottom portion 12 of the heat receiver 1 may be provided a reflector having concavities and convexities on the surface thereof, an irregular surface, or fine concavities and convexities of uneven texture.

Furthermore, the reflector may be arranged not only on the inner wall of the bottom portion 12 of the heat receiver 1, but also on the inner wall of the side portion. If L satisfies L≥2D, then the inner wall surface area thereof is mostly occupied by the area of the inner wall of the side portion 11. For this reason, as far as heat absorption contribution ratio is concerned, the contribution to the side portion 11 is the highest, while that to the bottom portion 12 is relatively low. In view of the heat absorption efficiency, it is more preferred that the reflector be arranged on the bottom portion 12.

Alternatively, without arranging any reflectors, there may be formed fine concavities and convexities on the surface of the inner walls of the side portion 11 and/or of the bottom portion 12 in the heat receiver, thereby allowing the solar light to be irregularly reflected.

Fourth Embodiment

Figure 6A:
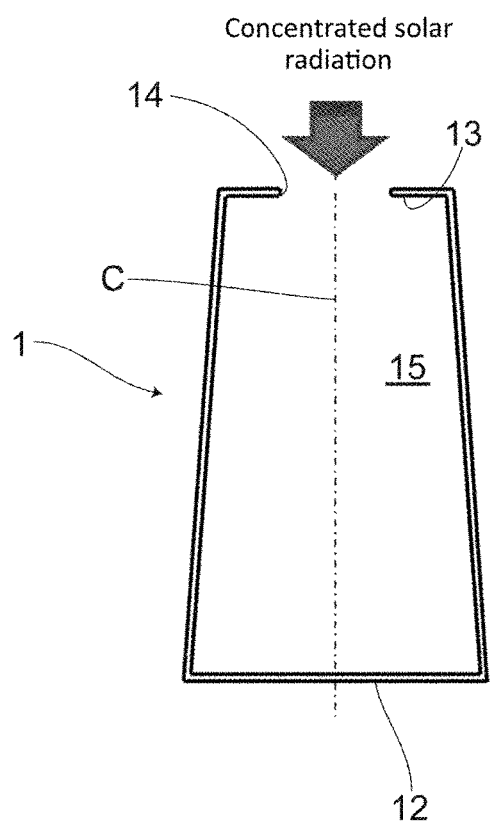
FIGS. 6A and 6B are explanatory drawings illustrating shapes of the heat receiver according to a forth embodiment.
Figure 6B:
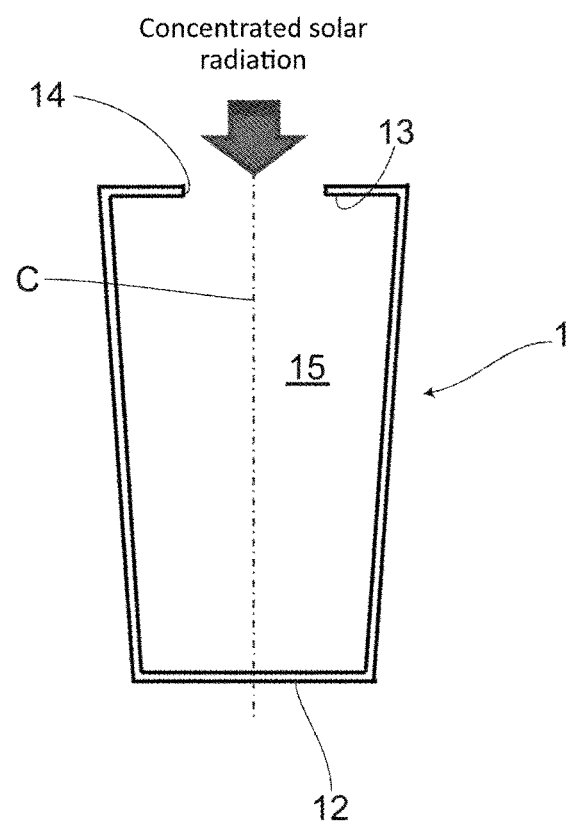

FIG. 6 illustrates an example of the heat receiver 1 having a difference in diameter between the top portion and the bottom portion. That is, the heat receiver may have varied diameters between the top portion and the bottom portion of the heat receiver 1 in order to smooth out the irradiation intensity of the solar light onto the inner wall of the heat receiver 1

Fifth Embodiment

Figure 7:
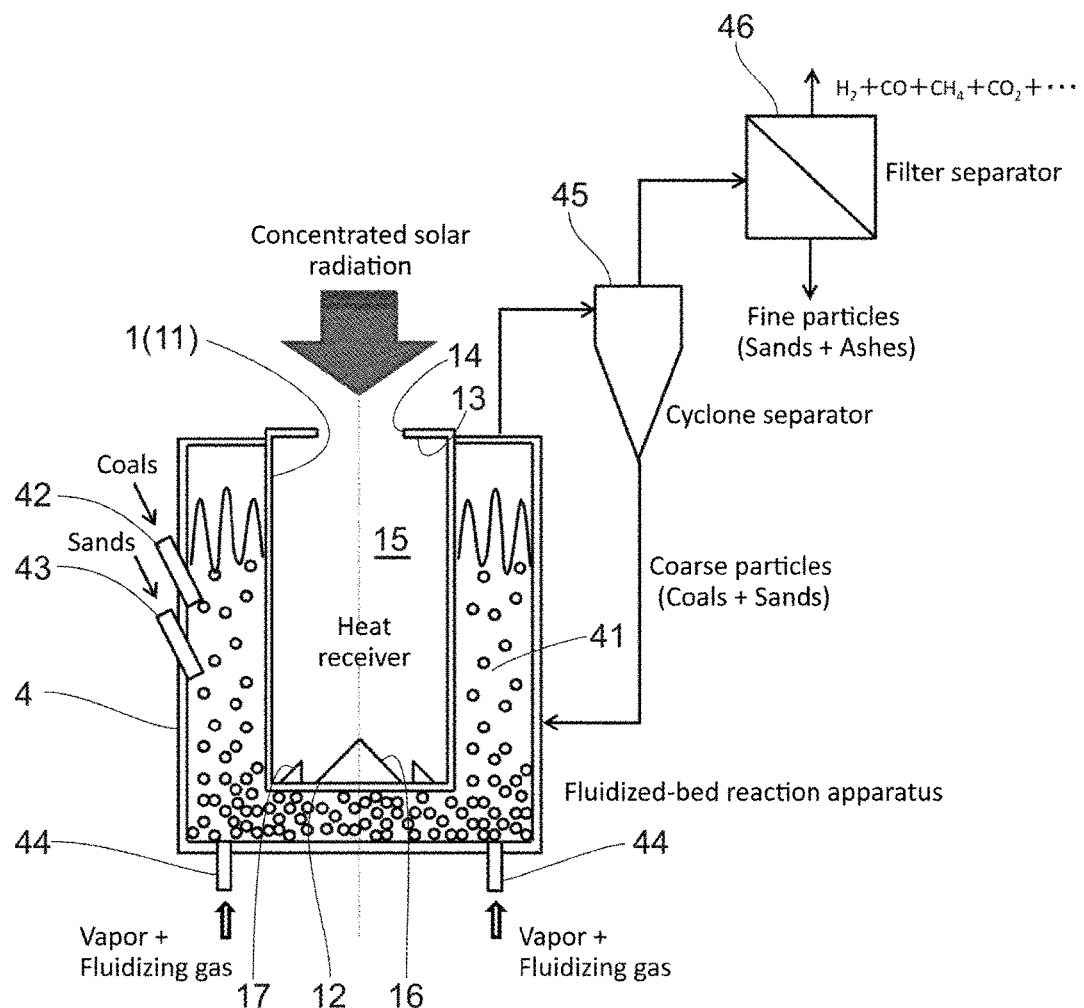
FIG. 7 is a schematic diagram illustrating a reaction apparatus according to a fifth embodiment thereof.

FIG. 7 illustrates an example of a fluidized-bed reactor 4 arranged around the periphery of the heat receiver 1. The collected solar lights enter the heat receiver 1, and then be reflected by a conical reflector 16 arranged on the bottom portion 12, and/or by circular reflectors 17 having triangular cross sections, letting the inner wall of the heat receiver 1 uniformly heated. The receiver 1 is made of a material such as Inconel, alumina, silicon carbide or stainless steel.

To the fluidized bed 41 is fed coal particles, sands, and water vapor (along with fluid gas if necessary) respectively through the inlet 42, the inlet 43, and the inlet 44. The fluidized bed 41 rapidly draws heat from the outer wall of the heat receiver 1 through an agitating effect of the fluidizing gas and sands. The coals and the water vapor is heated, and then decomposed or turned into hydrogen, carbon monoxide, and/or methane gas or the like, which are subsequently discharged out of the fluidized bed 41 via the top portion thereof. These gases accompany, e.g., unreacted coals, ashes, and/or sands. These coarse coal particles and/or sands are isolated through a cyclone separator 45, and the isolated coarse coal particles and/or sands are subsequently refed to the fluidized bed 41. The fine particles not separated by the cyclone separator 45 are filtered through a filter separator 46, and then separately collected.

It is needless to say that the energy efficiency of the system will be enhanced by the employment of a heat exchanger, though not shown in the figure, to take advantage of the heat energy in the resultant hot hydrogen, carbon monoxide, and/or methane gas or the like for heating water vapor and/or fluidizing gas that are fed to the reactor 4.

Further, the reaction apparatus can be entirely formed of metal, which allows it to be used under reactive conditions of high temperature and pressure.

Sixth Embodiment

Figures 8A, 8B, 8C:
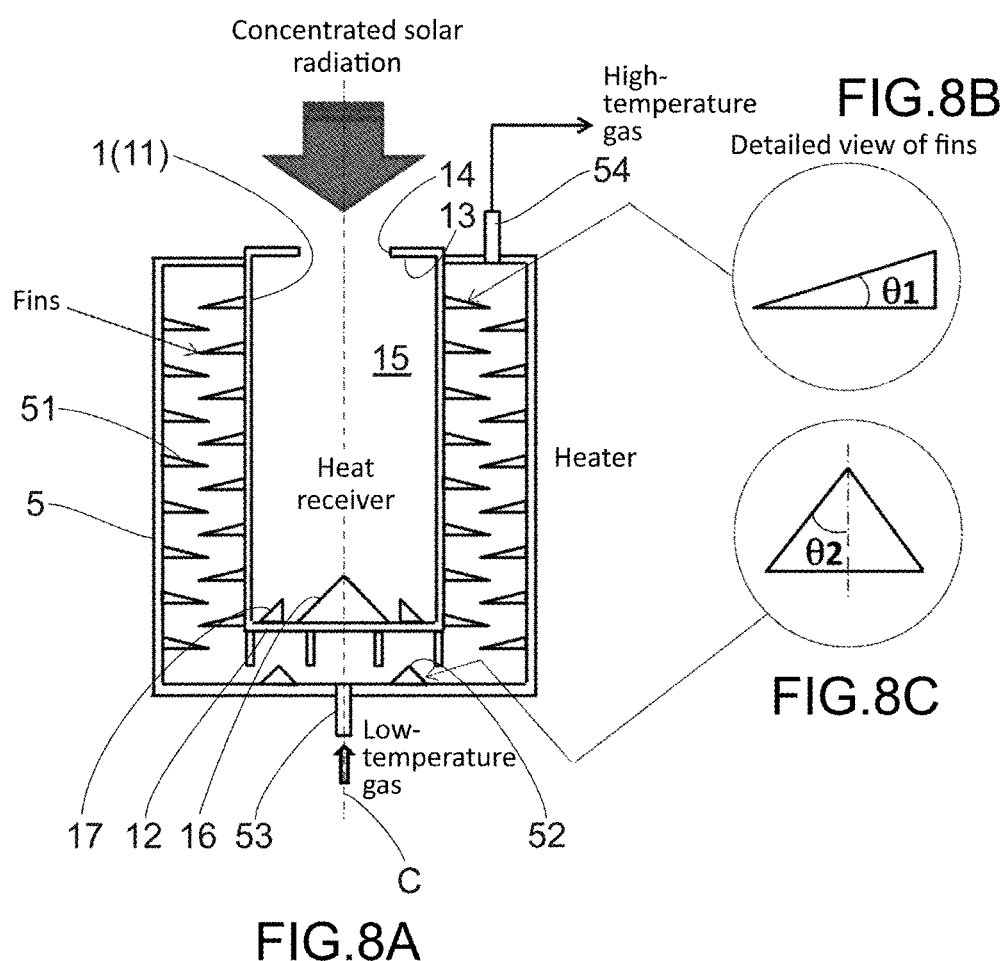
FIGS. 8A-8C are schematic diagrams illustrating a heating apparatus according to a six embodiment thereof.

FIG. 8 illustrates an example where a heater 5 is arranged around the periphery of the heat receiver 1. The collected solar lights enter the heat receiver 1, and then be reflected by the conical reflector 16 arranged on the bottom portion 12, and/or by the circular reflectors 17 having triangular cross sections, letting the inner wall of the heat receiver 1 uniformly heated. The receiver 1 is made of a material such as Inconel, alumina, silicon carbide or stainless steel.

On the inner wall of the heater 5 is attached a multitude of fins 51 having special shapes, and the fins 51 rapidly draw heat from the heat receiver 1 to make use of the heat for heating the air. As can be seen clearly from above, the fins 51 contribute to an increase of heat transmission area, thereby enabling effective heating of the air inside the heater 5. It is preferable that each fin 51 have an edge angle $\theta 1$ in a range of 10 to 30 degrees depending on the shape and operating conditions of the heater 5.

Further, the heater 5 is provided with flow rectifiers 52 arranged on the bottom portion. They are designed to rectify the flow of the gas and to reduce the occurrence of swirls. It is preferable that the angle $\theta 2$ defined by a slope of the each rectifier 52 and the central line C of the heat receiver 1 is in a range of 20° to 60° degrees depending on the shape and operating conditions of the heater 5.

A low-temperature gas thus introduced through an inlet 53 arranged on the bottom portion of the heater 5 is heated within the heater 5, and then discharged, as a high-temperature gas, through an outlet 54 provided on the top portion of the heater 5. The resultant high-temperature gas is fed for a power generation of high-temperature gas turbine (not shown), or for a storage of heat including sensible heat, latent heat, or chemical heat (not shown).

If the heater 5 is smeared with scales on its inner wall and/or fins 52, fine sands may be fed to the heater 5 to fluidize them in order thus to remove the adhered scales.

Seventh Embodiment

Figure 9:
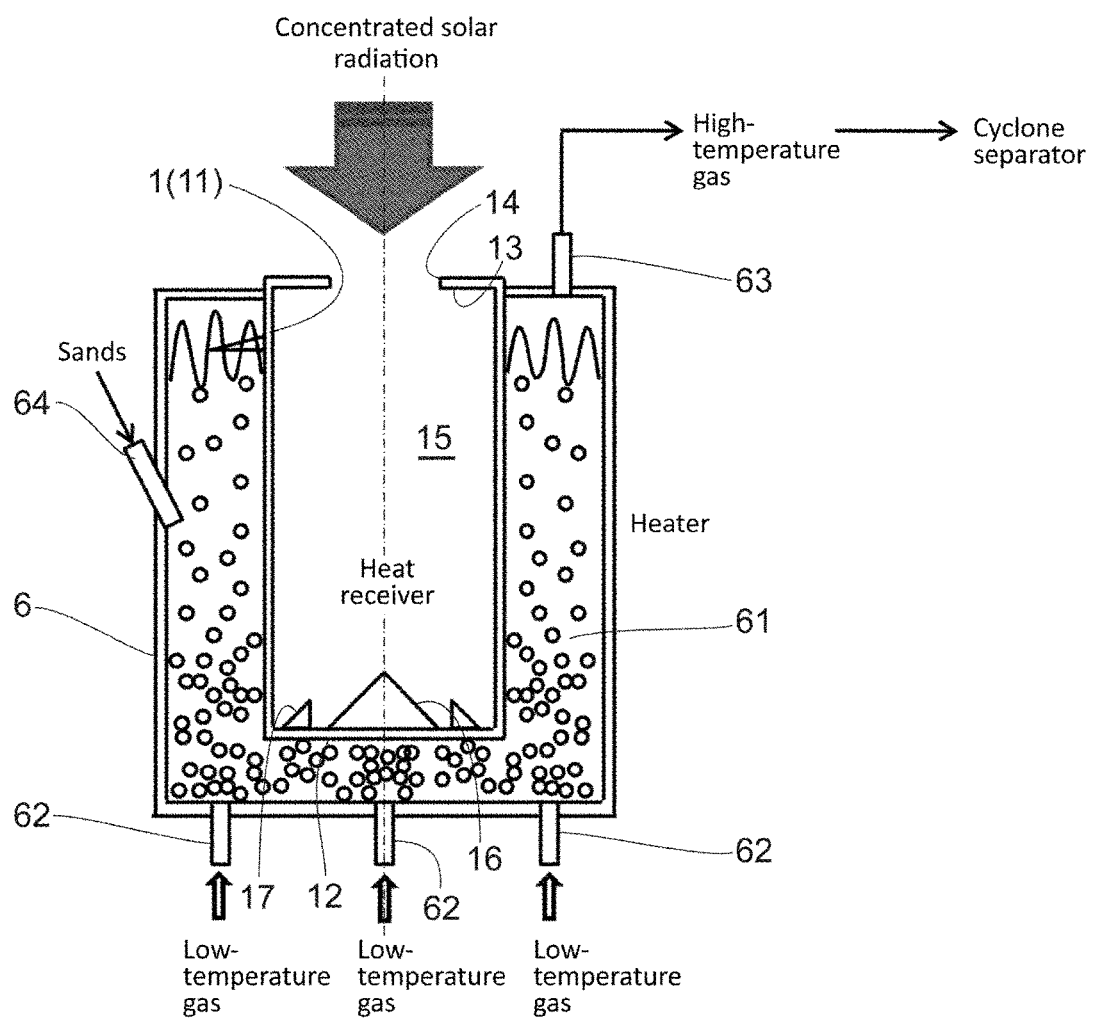
FIG. 9 is a schematic diagram illustrating a heating apparatus according to a seventh embodiment thereof.

FIG. 9 illustrates another example where a fluidized-bed heater 6 is arranged around the periphery of the heat receiver 1. The fluidized bed 61 is supplied with a low-temperature gas via an inlet 62, and the gas rapidly draws heat in the heat receiver 1 by the fluidized bed 61. Here, the fluidized bed 61 works as a heat exchanger having high heat transfer rate. The heated gas is then discharged as a high-temperature gas out of the heater 6 via an outlet 63 provided on the top portion of the heater 6. Here, the numeral 64 denotes an inlet for introducing the sands, consisting the fluidized bed 61, to the heater 6.

Eighth Embodiment

Figure 10:
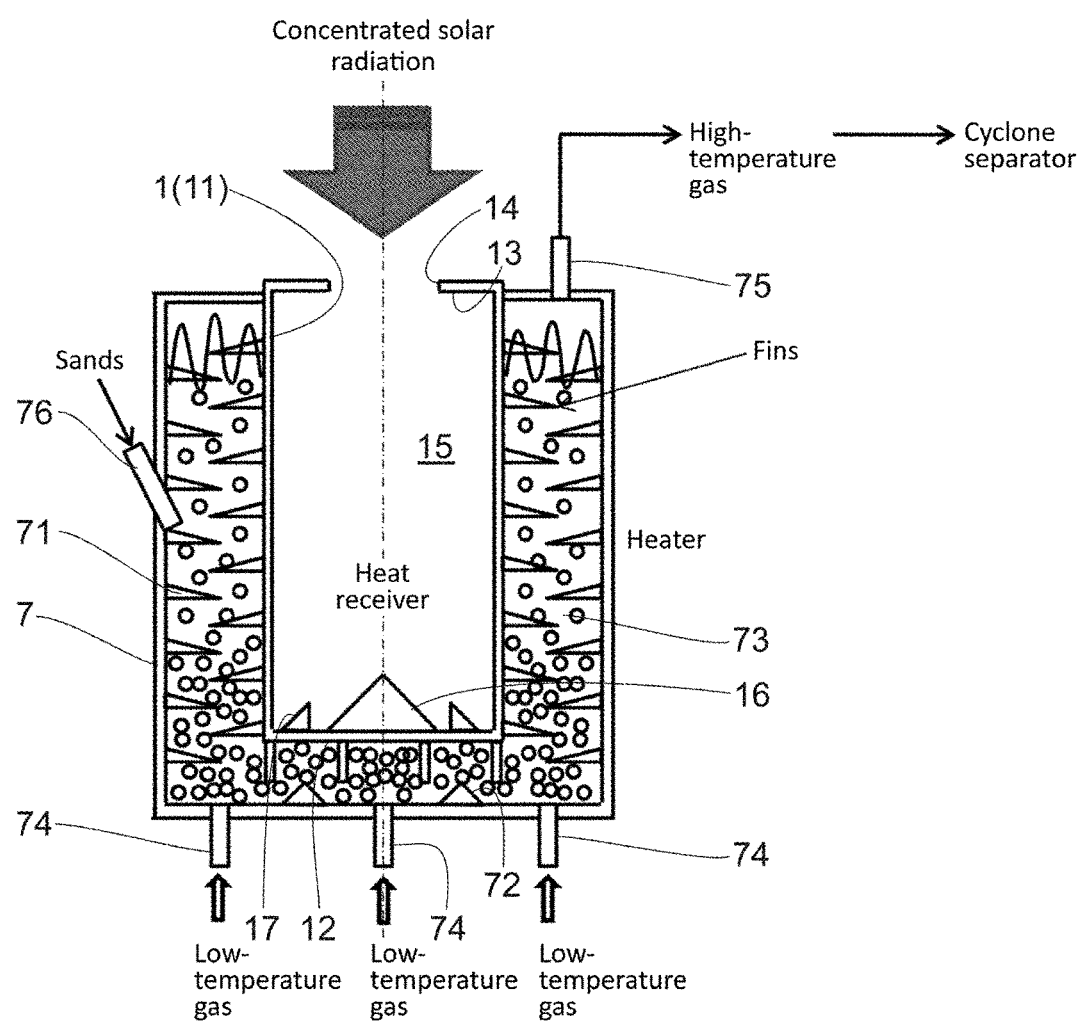
FIG. 10 is a schematic diagram illustrating a heating apparatus according to an eighth embodiment thereof.

FIG. 10 illustrates a combined example of the sixth embodiment and the seventh embodiment. On the inner wall of the heater 7 is attached a multitude of fins 71 having special shapes. The fins 71 rapidly draw heat from the heat receiver 1 to make use of the heat for heating the air. Also, the heater 5 is provided with flow rectifiers 72 arranged on the bottom portion of the heater 5.

The fins 71 work to agitate the fluidized bed 73 and the gas that fluidizes the fluidized bed 73 to serve in the role of promoting thermal conduction. Also, the scales adhered to the fins are to be removed by the random movement of particles inside the fluidized bed 73.

A low-temperature gas introduced through an inlet 73 arranged on the bottom portion of the heater 7 is heated inside the heater 7, and then discharged, as a high-temperature gas, through an outlet 74 provided on the top portion of the heater 7. Here, the numeral 76 denotes an inlet for introducing sands, constituting the fluidized bed 73, to the heater 7.

Ninth Embodiment

Figure 11A:
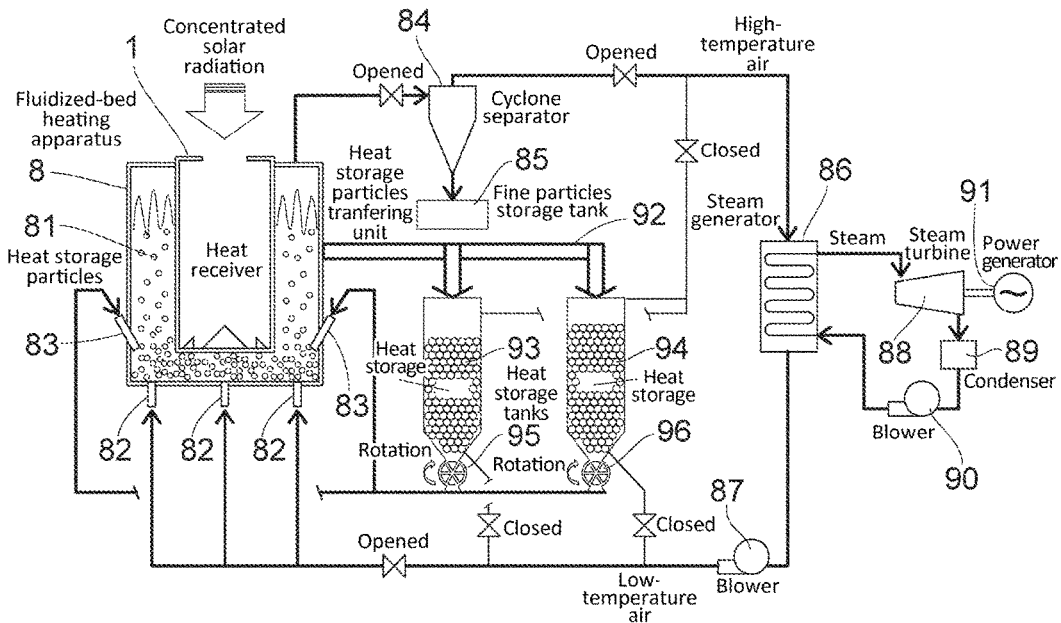
FIGS. 11A and 11B are schematic diagrams illustrating an example of the heating apparatus, according to a ninth embodiment, applied to a heat storage system of solid particles.
Figure 11B:
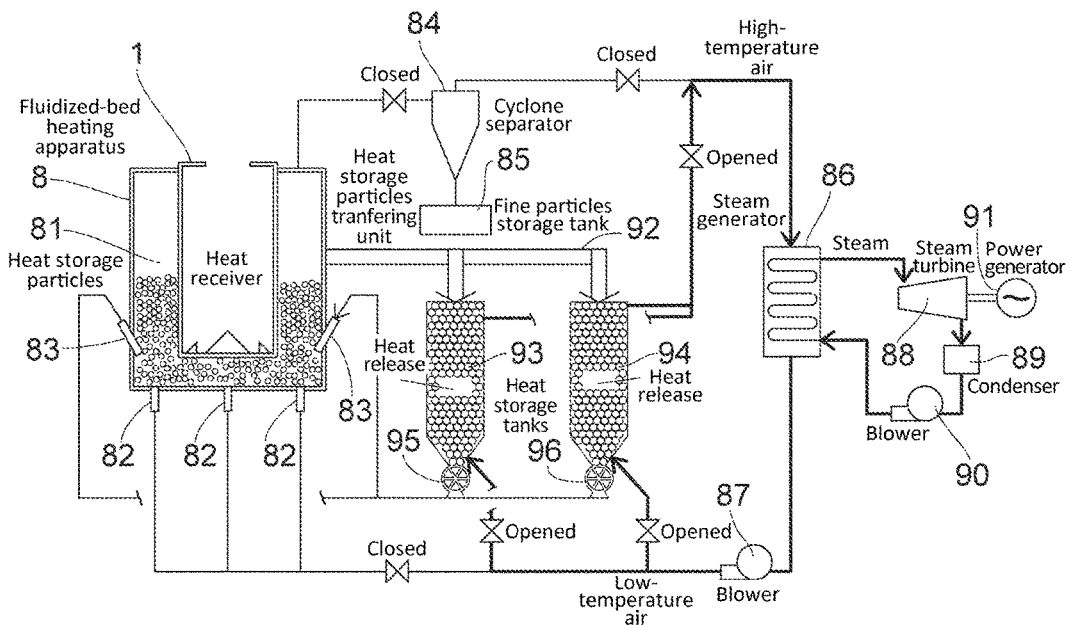

FIG. 11 illustrates an example of a fluidized-bed heating apparatus applied to a heat storage system of solid particles. As illustrated in FIG. 11 (a), when being exposed to the solar light, the concentrated solar radiation is irradiated upon the heat receiver 1. Around the periphery of the heat receiver 1 is arranged a fluidized-bed heater 8, and most of the heat, associated with the concentrated solar radiation, received by the heat receiver 1 is rapidly conducted to a fluidized bed 81 stored within the heater 8. Here, to the heater 8 is supplied a low-temperature air through an inlet 82 arranged on the bottom portion of the heater 8, while being fed with metallic oxide particles, serving as heat storage particles constituting the fluidized bed 81, through an inlet 83 arranged on the side portion of the heater 8. The air fed from the inlet 82 vigorously fluidizes the fluidized bed 81, causing the air and the metallic oxide particles to be rapidly heated to a high temperature. The heated metallic oxide particles emit oxygen through a chemical reaction, thereby storing heat. That is, the metallic oxide particles store both sensible and thermochemical heat.

There may be used metallic oxide particles including barium oxide ($BaO_2$), cobalt oxide ($Co_3O_4$), manganous oxide ($Mn_2O_3$), and copper oxide (CuO). The reaction formula for the case of using cobalt oxide is shown as below:

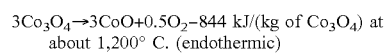

$3Co_3O_4 \rightarrow 3CoO + 0.5O_2 - 844$ kJ/(kg of $Co_3O_4$) at about 1,200° C. (endothermic)

The high-temperature air flows through the top portion of the heater 8 to a cyclone separator 84, and fine particles contained in that air are removed by the cyclone separator 84 and then stored in a storage tank 85. The air subsequently flows to a steam generator 86 through which water is heated, generating steam, thus causing the air to be in a lower temperature, which is then refed to the heater 8. Here, circulation of the air, as described above, is carried out through an operation of a blower 87. The steam generated in the steam generator 86 rotates a steam turbine 88, and then refed through a condenser 89 and a blower 90 to the steam generator 86. A power generator 91 generates electricity by the rotation of the steam turbine 88.

The high-temperature metallic oxide particles within the heater 8 is mostly transferred by a transfer unit 92 arranged outside of the heater 8 to one heat storage tank 93 among the heat storage tanks 93 and 94, and is subsequently stored thereinside. Meanwhile, low-temperature metallic oxide particles are fed from the other heat storage tank 94 to the heater 8 by means of a feeding unit 96. As soon as transfer of the metallic oxide particles, from the heater 8 to the one heat storage tank 93, and feeding of the metallic oxide particles, from the other heat storage tank 94 to the heater 8, are both finished, the transfer unit 92 subsequently transports the high-temperature metallic oxide particles from the heater 8 to the other heat storage tank 94, while at the same time, the feeding unit 95 feeds the low-temperature metallic oxide particles from the one heat storage tank 93 to the heater 8. In this say, metallic oxide particles are alternatingly transferred to the heat storage tanks 93 and 94 from then on.

Described hereinabove is an example of two heat storage tanks although a multitude of heat storage tanks may be provided to increase the heat storage thereof.

As illustrated in FIG. 11 (b), when not being exposed to the solar light, a valve will be switched thereto to limit the circulation of the air exclusively between the heat storage tanks 93 and 94 and the steam generator 86. That is, air circulation between the heater 8 and the steam generator 86 is shut out. Additionally, the feeding units 95 and 96 stops their operation. The air is fed to the heat storage tanks 93 and 94 through the bottom portions thereof, and then sent through the metallic oxide particles stored within the heat storage tanks 93 and 94 to the steam generator 86 via top portions of the heat storage tanks 93 and 94. Inside the heat storage tanks 93 and 94, the metallic oxide particles react with oxygen to generate heat, allowing the air to be heated. The reaction formula for the case of using cobalt oxide for metallic oxide particles is shown as below:

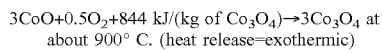

$3CoO+0.5O_2+844$ kJ/(kg of $Co_3O_4$)→$3Co_3O_4$ at about 900° C. (heat release=exothermic)

The air heated in the heat storage tanks 93 and 94 then flows to a steam generator 86 through which water is heated, generating steam, thus causing the air to be in a lower temperature, which is then refed to the heat storage tanks 93 and 94. Here, circulation of the air, as described above, is carried out through an operation of a blower 87. The steam generated in the steam generator 86 rotates a steam turbine 88, and then refed through a condenser 89 and a blower 90 to the steam generator 86. The power generator 91 generates electricity by the rotation of the steam turbine 88.

Tenth Embodiment

This embodiment is a modified example of the ninth embodiment where metallic oxide particles of small particle diameter are used to transfer the metallic oxide particles along with the air flow from the heater 8 to the heat storage tanks 93 and 94.

Figure 12A:
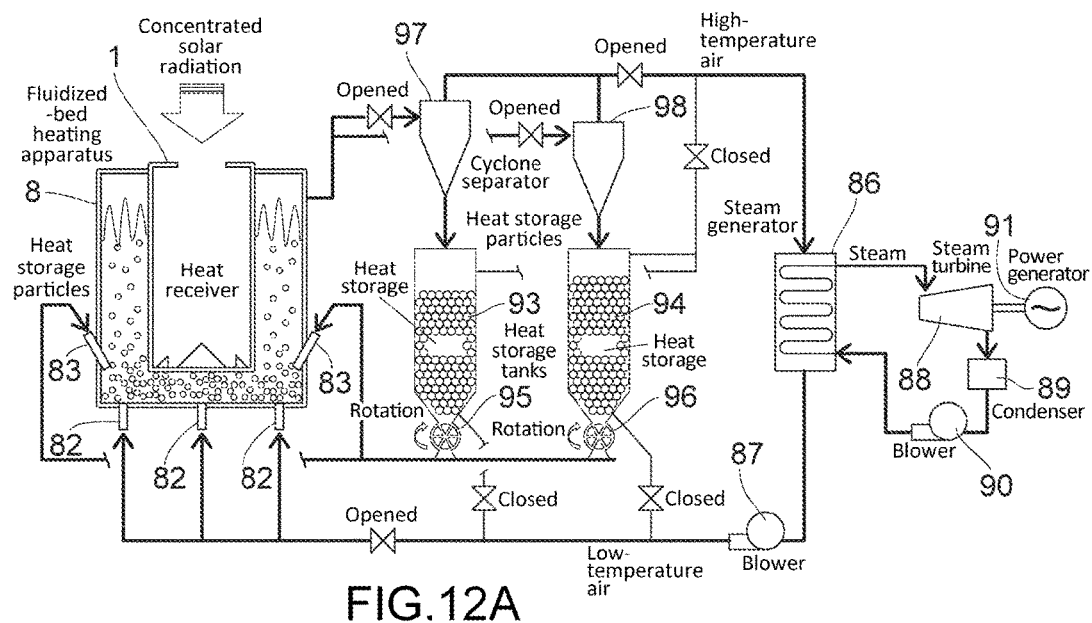
FIGS. 12A and 12B are schematic diagrams illustrating an example of the heating apparatus, according to a tenth embodiment, applied to a heat storage system of solid particles.
Figure 12B:
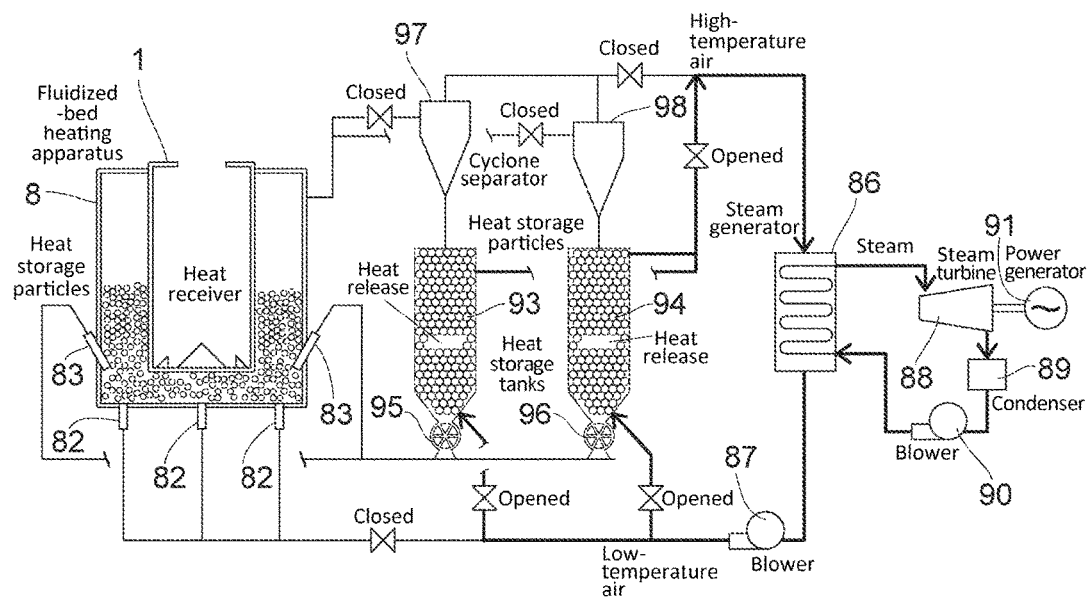
Figure 14:
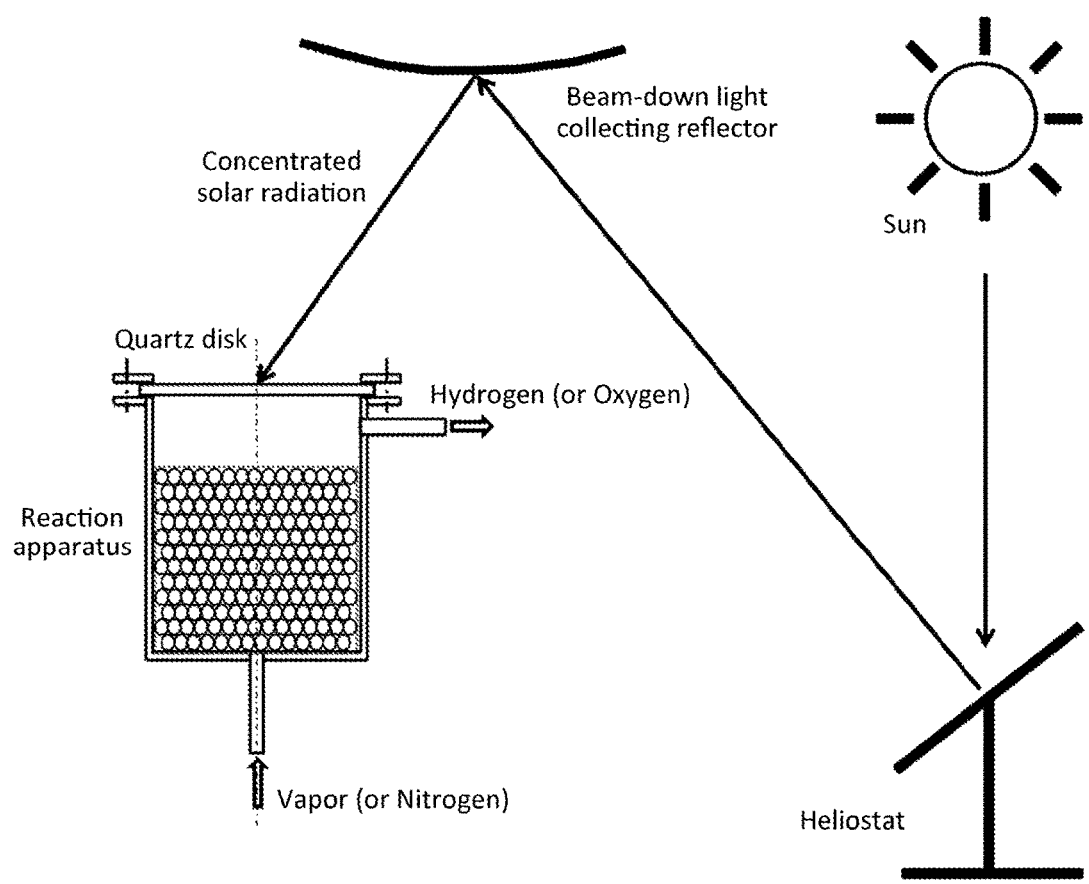
FIG. 14 is a schematic diagram illustrating a conventional hydrogen production system (of beam-down type) by means of two-step water-splitting cycle using solar light collection.
Figure 15:
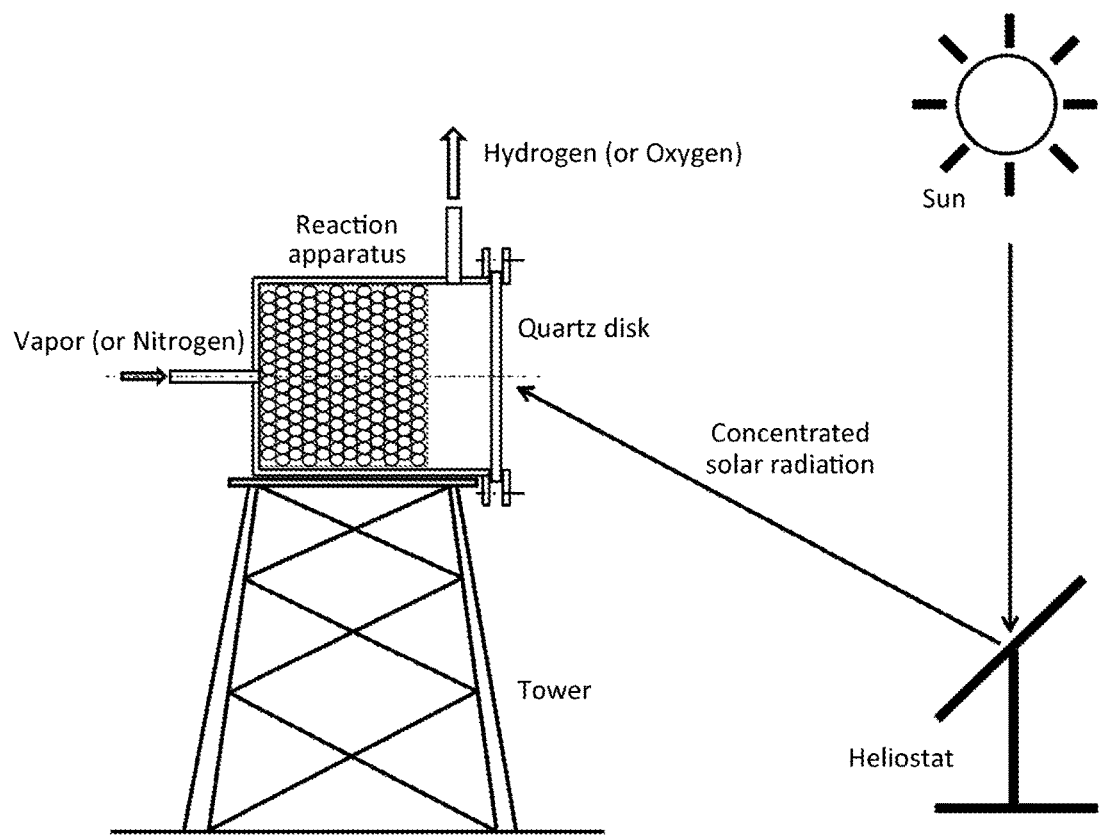
FIG. 15 is a schematic diagram illustrating a conventional hydrogen production system (towered) by means of two-step water-splitting cycle using solar light collection.
Figure 16:
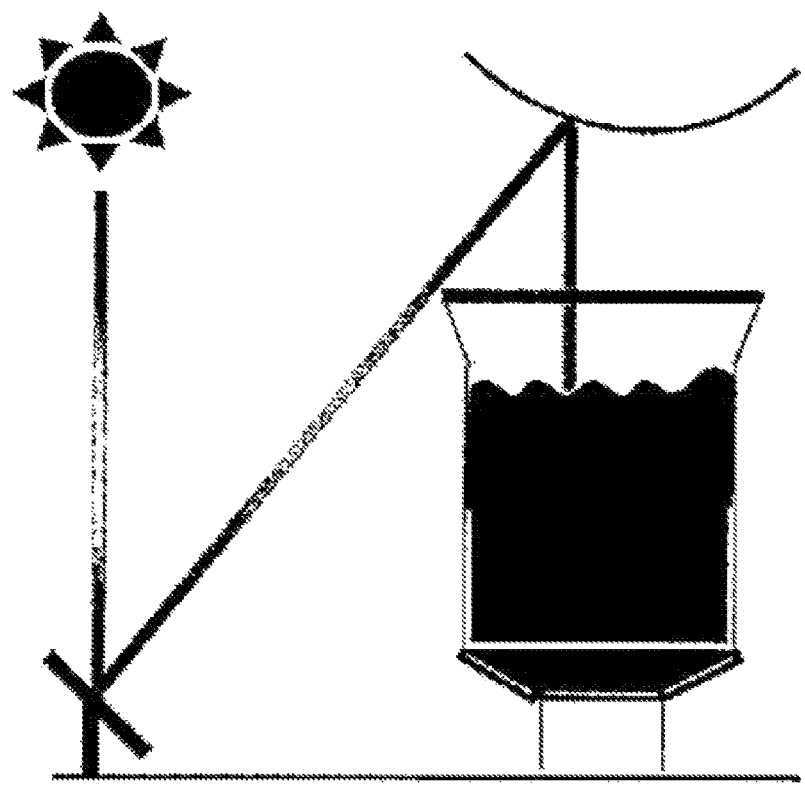
FIG. 16 is a schematic diagram illustrating a conventional thermal decomposition system of coke using solar light collection.

As illustrated in FIG. 12 (a), when the system is exposed to the solar light, the concentrated solar radiation is irradiated upon the heat receiver 1. Around the periphery of the heat receiver 1 is arranged a fluidized-bed heater 8, and most of the heat, associated with the concentrated solar radiation, received by the heat receiver 1 is rapidly conducted to a fluidized bed 81 stored within the heater 8. Here, to the heater 8 is fed a low-temperature air through an inlet 82 arranged on the bottom portion of the heater 8, while being fed with metallic oxide particles, serving as heat storage particles constituting the fluidized bed 81, through an inlet 83 arranged on the side portion of the heater 8. The air fed from the inlet 82 vigorously fluidizes the fluidized bed 81, causing the air and the metallic oxide particles to be rapidly heated to a high temperature. The heated metallic oxide particles emit oxygen through a chemical reaction, thereby storing heat. That is, the metallic oxide particles store both sensible heat and thermochemical heat.

The high temperature mixture of the air and metallic oxide particles is led to one cyclone separator 97 through the upper portion of the heater 8, and the high-temperature metallic oxide particles are separated from the air by the cyclone separator 97 and then fed to the heat storage tank 93. Meanwhile, the low-temperature metallic oxide particles are fed from the other heat storage tank 94 to the heater 8 by means of a feeding unit 96. As soon as the transfer of the metallic oxide particles from the heater 8 to the heat storage tank 93, and the feeding of the metallic oxide particles from the heater 8 to the other heat storage tank 94 are both finished, the other cyclone separator 98 subsequently separates the high-temperature metallic oxide particles from the air and then send them to the other heat storage tank 94, while at the same time, the feeding unit 95 feeds the low-temperature metallic oxide particles from the heat storage tank 93 to the heater 8. In this say, metallic oxide particles are alternatingly transferred, from then on, to the heat storage tanks 93 and 94.

After that, the air being separated from the metallic oxide particles by the cyclone separators 97 and 98 then flows to a steam generator 86 through which water is heated, generating steam, thus causing the air to be in a lower temperature, which is then refed to the heater 8. Here, circulation of the air, as described above, is carried out through an operation of a blower 87. The steam generated in the steam generator 86 rotates a steam turbine 88, and then be refed through a condenser 89 and a blower 90 to the steam generator 86. A power generator 91 generates electricity by the rotation of the steam turbine 88.

As illustrated in FIG. 12 (b), when not being exposed to the solar light, a valve will be switched thereto to limit the circulation of the air exclusively between the heat storage tanks 93 and 94 and the steam generator 86. That is, air circulation between the heater 8 and the steam generator 86 is shut out. Additionally, the feeding units 95 and 96 stops their operation. The air is fed to the heat storage tanks 93 and 94 through the bottom portions thereof, and then sent through the metallic oxide particles stored within the heat storage tanks 93 and 94 to the steam generator 86 via top portions of the heat storage tanks 93 and 94. Inside the heat storage tanks 93 and 94, the metallic oxide particles react with oxygen to generate heat, thus allowing the air to be heated.

The air heated in the heat storage tanks 93 and 94 then flows to a steam generator 86 through which water is heated, generating steam, thus causing the air to be in a lower temperature, which is then refed to the heat storage tanks 93 and 94. Here, circulation of the air, as described above, is carried out through an operation of a blower 87. The steam thus generated in the steam generator 86 rotates a steam turbine 88, and then be refed through a condenser 89 and a blower 90 to the steam generator 86. The power generator 91 generates electricity by the rotation of the steam turbine 88.

Eleventh Embodiment

FIG. 13 illustrates a modified embodiment of the fifth embodiment. According to this embodiment, a draft tube 47 is provided within the reactor 4 and outside the side portion 11 of the heat receiver 1, constituting an internally circulating fluidized-bed reactor.

The draft tube 47 is made of a cylinder having a diameter greater than that of the heat receiver 1. The inlets 44 are arranged outside of the side portion 11 of the heat receiver 1 and inside of the draft tube 47 when viewed from the top. Also, the draft tube 47 is submerged in the fluidized bed 41. Owing to this configuration, the water vapor and the fluidizing gas that are introduced from the inlet 44 flow into the gap between the heat receiver 1 and the draft tube 47, and then the fluidized bed 41 moves upwardly through the inner side of the draft tube 47 with a flow of the water vapor and the fluidizing gas introduced therefrom. After the elevation of the fluidized bed 41 through the inner side of the draft tube 47, the fluidized bed 41 falls through the outer side of the draft tube 47, and then once again moves upwardly through the inner side of the draft tube 47, thereby forming so-called internally circulating flow.

Here, the energy of the concentrated solar radiation is absorbed in the inner wall of the heat receiver 1, thus causing the inner wall to be at the highest temperature. Hence, in order to carry out the reactions in an efficient manner within the reactor 4, heats need to be rapidly drawn from the inner wall to the inside of the reactor 4.

The internally circulating fluidized-bed reactor 4 employed in the present embodiment contains particles that are systematically fluidized, thereby allowing the inside of the reactor 4 to have extremely high heat-transfer rate. Consequently, heat in the heat receiver 1 is rapidly drawn into the reactor 4. Also, the fluidized movement allows fluidized bed 41 to have almost uniform distribution in temperature. Owing to this feature, the fluidized bed 41 allows efficient reactions in all over the fluidized bed 41.

DESCRIPTION OF THE REFERENCE NUMERAL

1 heat receiver
2,4 reactor
5, 6, 7, 8 heater
11 side portion
12 bottom portion
13 ceiling
14 aperture
15 cavity
16 reflector
17 reflector
47 draft tube
51, 71 fins
52, 72 rectifiers
C central line of the cavity 15
D diameter of the cavity 15
D length of the aperture 14
L length of the cavity 15
Θ elevation angle with respect to the central line C of the cavity 15
α incident angle of the concentrated solar radiation, the angle defined by the elevation angle with respect to the central line C

The invention claimed is:

1. A reaction apparatus comprising:
   a heat receiver of concentrated solar radiation comprising:
      a side portion having an inner wall, said inner wall absorbing solar light;
      a bottom portion connected to a lower end of the side portion;
      a ceiling connected to an upper end of the side portion;
      an aperture provided in the ceiling; and
      a reflector provided on the bottom portion inside the receiver, said reflector reflecting the solar light toward the inner wall of the side portion; and
   a reactor arranged around the heat receiver with a predetermined distance from the heat receiver in a manner covering the side and bottom portions of the heat receiver, said reactor containing:
      a fluidized bed; and
      a draft tube submerged in the fluidized bed,
   wherein the heat receiver has a cavity defined by the side portion, the bottom portion and the ceiling,
   the aperture connects to a portion of the cavity, and
   the reflector has a conical shape that protrudes from the bottom portion.

2. The reaction apparatus according to claim 1, wherein said aperture has an opening area of s satisfying an inequation s≤S/4 wherein S denotes an inner surface area of the ceiling inclusive of the opening area of the aperture within the cavity.

3. The reaction apparatus according to claim 2, wherein said receiver is made of any one of Inconel, alumina, silicon carbide and stainless steel.

4. The reaction apparatus according to claim 3, wherein said receiver is made of a black material, or has an inner wall coated with black paint.

5. The reaction apparatus according to claim 1, wherein said cavity has an substantially cylindrical shape and said aperture has an substantially circular shape, wherein if D denotes a diameter of said cavity, L denotes a length of the cavity and d denotes a diameter of the aperture, they satisfy inequations L≥2D and d≤D/2.

6. The reaction apparatus according to claim 5, wherein said receiver is made of any one of Inconel, alumina, silicon carbide and stainless steel.

7. The reaction apparatus according to claim 6, wherein said receiver is made of a black material, or has an inner wall coated with black paint.

8. The reaction apparatus according to claim 5, wherein said cavity has a first diameter at the ceiling different than a second diameter at the bottom portion.

9. The reaction apparatus according to claim 8, wherein said receiver is made of any one of Inconel, alumina, silicon carbide and stainless steel.

10. The reaction apparatus according to claim 9, wherein said receiver is made of a black material, or has an inner wall coated with black paint.

11. The reaction apparatus according to claim 5, wherein the reflector is provided in a central part of the bottom portion and has a diameter not smaller than said diameter of d, and
    an elevation angle of the reflector, with respect to the central axis of the cavity, is in a range from 30° to 60° degrees.

12. The reaction apparatus according to claim 11, wherein said cavity has a first diameter at the ceiling different than a second diameter at the bottom portion.

13. The reaction apparatus according to claim 11, wherein said receiver is made of any one of Inconel, alumina, silicon carbide and stainless steel.

14. The reaction apparatus according to claim 13, wherein said receiver is made of a black material, or has an inner wall coated with black paint.

15. The reaction apparatus according to claim 11, further comprising at least one reflector concentrically arranged on the bottom portion.

16. The reaction apparatus according to claim 15, wherein said cavity has a first diameter at the ceiling different than a second diameter at the bottom portion.

17. The reaction apparatus according to claim 15, wherein said receiver is made of any one of Inconel, alumina, silicon carbide and stainless steel.

18. The reaction apparatus according to claim 17, wherein said receiver is made of a black material, or has an inner wall coated with black paint.

19. The reaction apparatus according to claim 1, wherein said receiver is made of any one of Inconel, alumina, silicon carbide and stainless steel.

20. The reaction apparatus according to claim 19, wherein said receiver is made of a black material, or has an inner wall coated with black paint.

21. The reaction apparatus according to claim 1, wherein the fluidized bed comprises coal particles, sands and water vapor.

* * * * *